(12) United States Patent
Chow

(10) Patent No.: US 11,792,895 B1
(45) Date of Patent: Oct. 17, 2023

(54) METHODS AND SYSTEMS FOR TRIAC SET POINT BASED CONTROL OF POWER DELIVERY

(71) Applicant: SharkNinja Operating LLC, Needham, MA (US)

(72) Inventor: Nicholas Chow, Boston, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/204,687

(22) Filed: Jun. 1, 2023

(51) Int. Cl.
  *H05B 6/08* (2006.01)
  *A47J 37/07* (2006.01)
  *H05B 1/02* (2006.01)

(52) U.S. Cl.
  CPC ............ *H05B 6/08* (2013.01); *A47J 37/0709* (2013.01); *A47J 37/0763* (2013.01); *A47J 37/0786* (2013.01); *H05B 1/0261* (2013.01)

(58) Field of Classification Search
  CPC ...... H05B 6/08; H05B 1/0261; A47J 37/0709; A47J 37/0763; A47J 37/0786
  USPC .......................................................... 219/665
  See application file for complete search history.

(56) References Cited

U.S. PATENT DOCUMENTS 5,470,142 A * 11/1995 Sargeant ............. A47L 15/4217
                                                  312/265.5
2013/0201316 A1 * 8/2013 Binder .................... H04L 67/12
                                                  701/2

* cited by examiner

*Primary Examiner* — Dana Ross
*Assistant Examiner* — Joseph W Iskra
(74) *Attorney, Agent, or Firm* — MINTZ LEVIN COHN FERRIS GLOVSKY AND POPEO, PC

(57) ABSTRACT

In an aspect, data representative of an electrical value is received and a target value for an inductive load based on the electrical value is accessed from memory of the controller. A target value for an inductive load can be accessed based on the electrical value. A transfer function based algorithm can be implemented for determining a set point value using the electrical value the set point value can be applied on a triode for alternating current (TRIAC). Operation of the inductive load to the target power responsive to the applying of the set point value on the TRIAC can be adjusted. The operation of the inductive load at the target power causes operation of the inductive load at the target value.

20 Claims, 26 Drawing Sheets

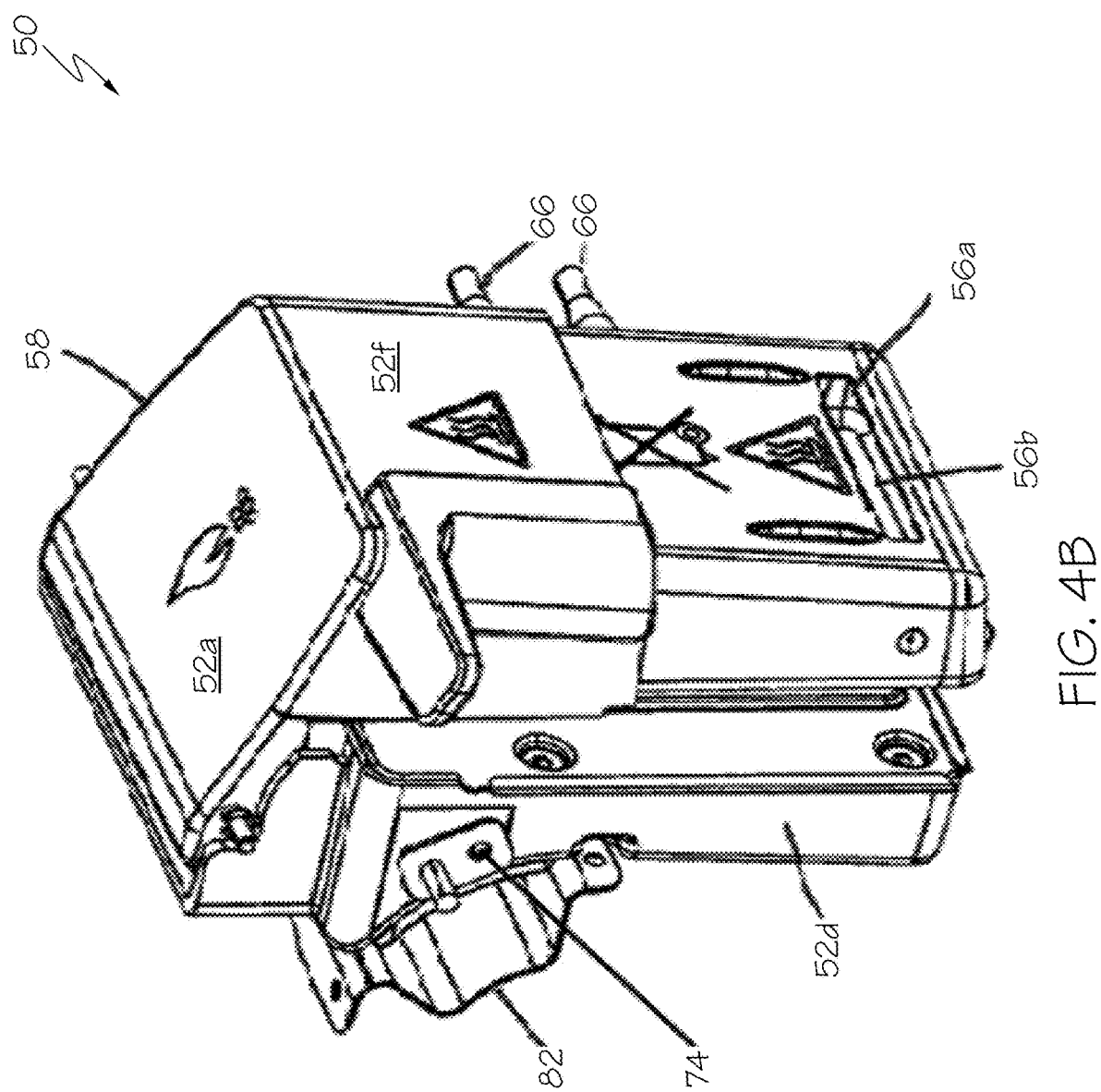

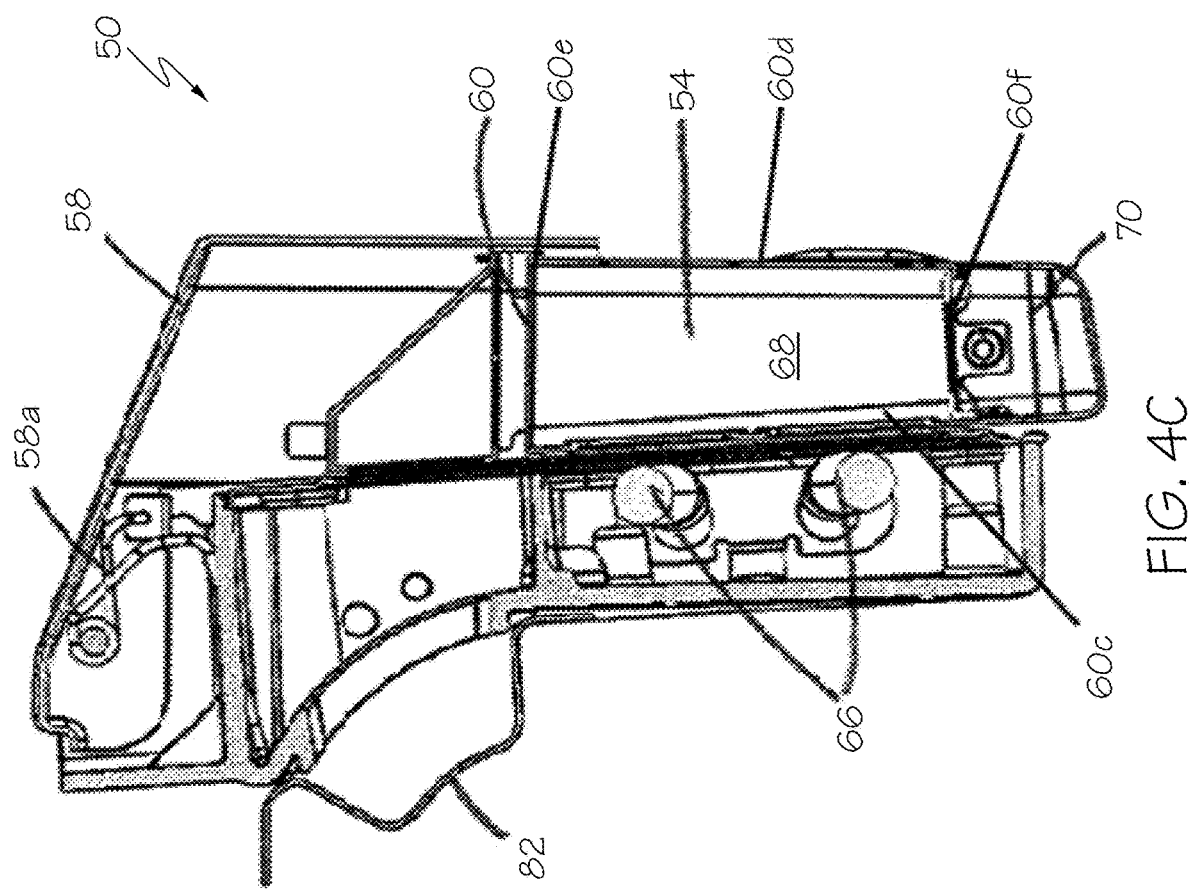

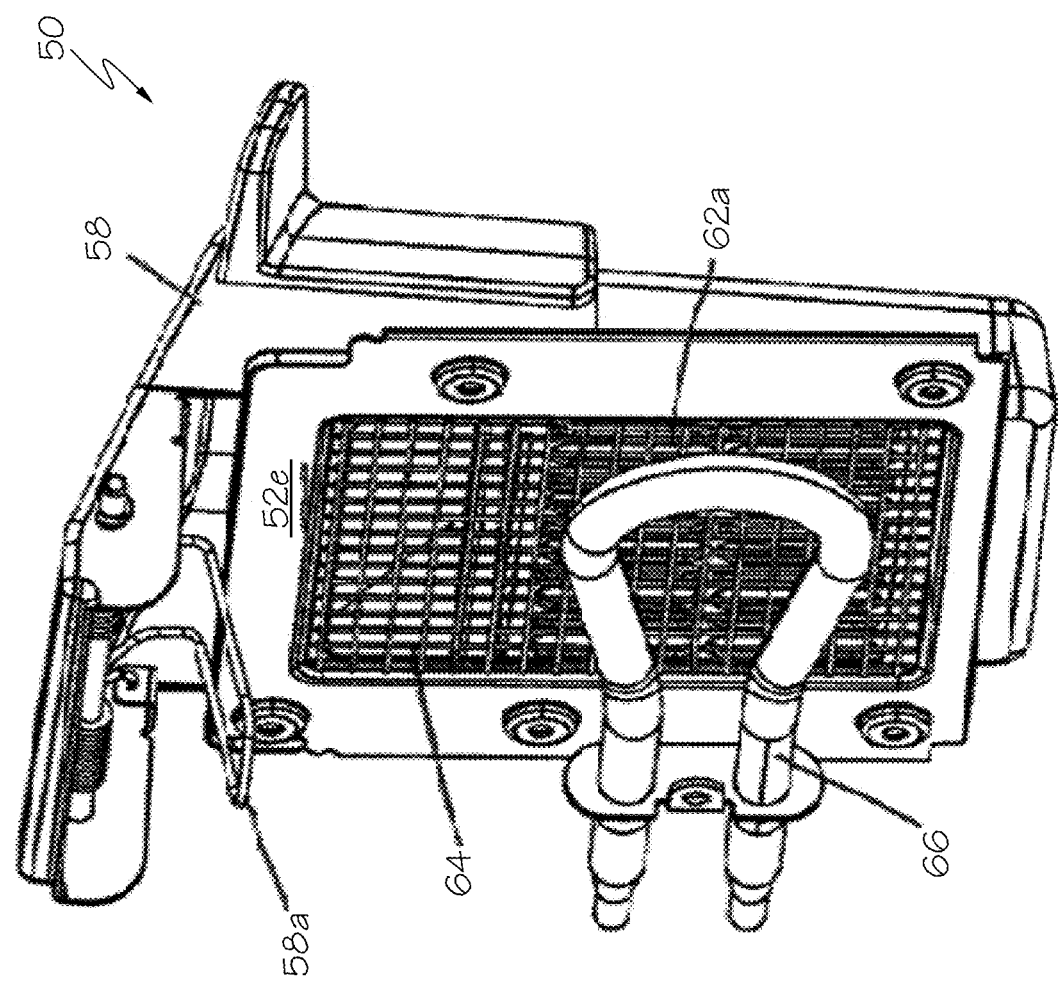

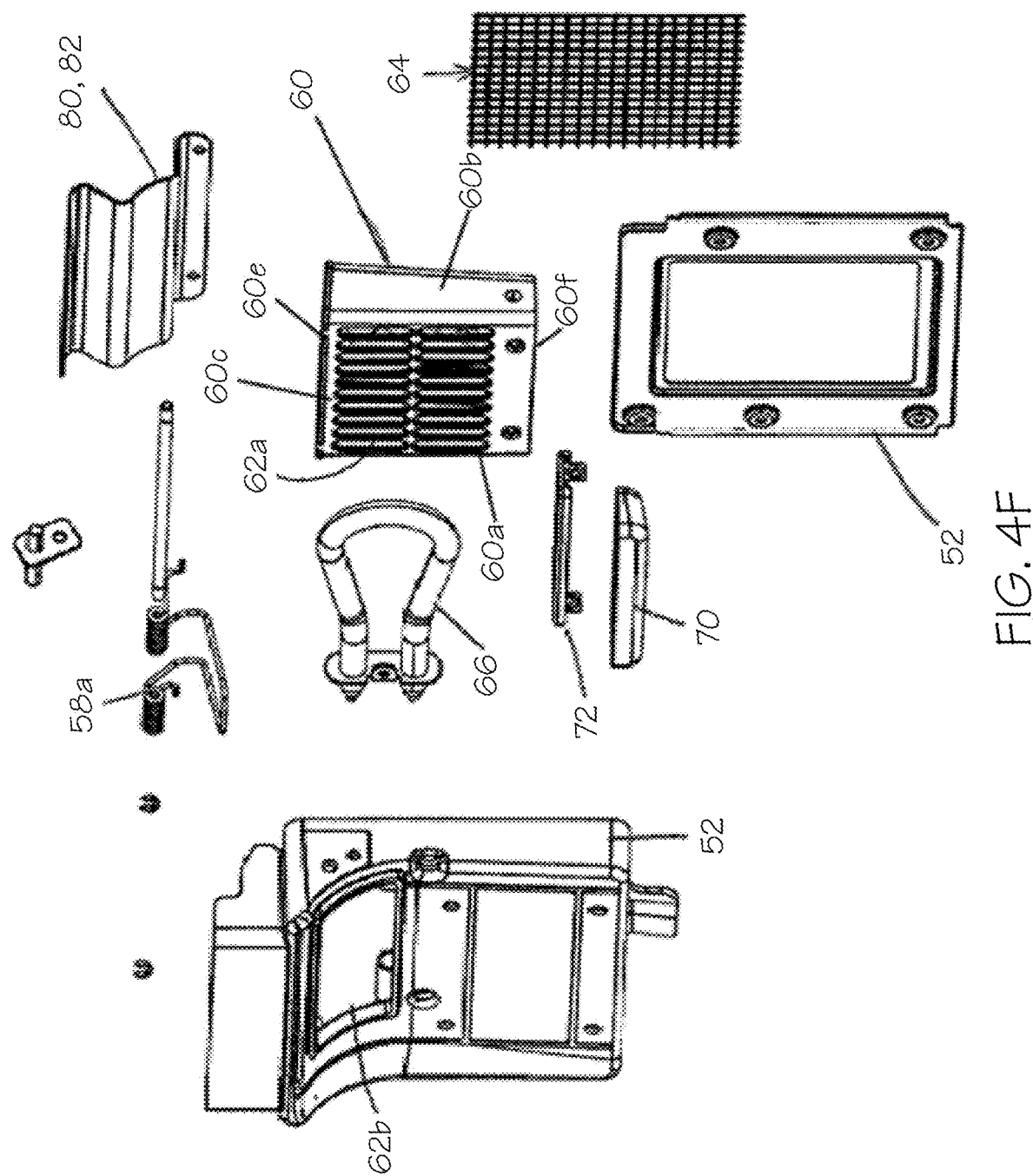

METHODS AND SYSTEMS FOR TRIAC SET POINT BASED CONTROL OF POWER DELIVERY

FIELD

A grill system including a smoke unit, and methods for initiating the combustion of fuel contained therein and controlling the delivery of power to inductive loads are provided.

BACKGROUND

Smoke can be used in a variety of cooking devices and with a variety of cooking operations to impart flavor. As an example, grills and grilling devices can come equipped with smoking capabilities, or the means with which to impart smoke flavor into food cooked with these grills and grilling devices. However, electric cooking appliances may only be able to impart limited smoke flavor or no smoke flavor into food cooked therewith. Further, in grilling systems which impart smoke flavor into food, control of the smoke output can be challenging.

Additionally, the quality of the smoke output can depend on how the fuel source used to generate the smoke is ignited. For example, if the fuel source is over-ignited by an igniter, the ignitor can provide an excessive amount of energy to the fuel source, such that there is too much combustion for the amount of airflow within the system and not enough oxygen supply to sustain a clean and efficient burn. For example, if the fuel source is under-ignited by the igniter, the igniter can provide too little energy to the fuel source, such that there is not a large enough ember generated to ensure a self-sustained combustion reaction that will spread throughout the rest of the fuel source in a consistent manner. In order to generate optimal smoke production for cooking, there is an ideal range of energy that must be provided to the fuel source from the ignitor such that there is just the right amount of heat to create a sustained combustion reaction, but not so much that combustion region starves itself of oxygen or burns through a fuel source more vigorously than intended.

However, reliably monitoring the performance of the fuel source ignition process, such that it results in optimized smoke production for cooking, can be difficult due to the nature of the perceivable outputs from combustion. For example, the physical outputs resulting from combustion of the fuel source are heat and combustion products such as smoke compounds or $CO_2$—therefore, in order to achieve closed loop control for combustion, a given control system must be able to detect those outputs from combustion in a statistically significant way. However, designing a system that would be cost effective and reliable enough to detect either of these outputs can be impractical. Additionally, closed loop control from the perspective of detecting combustion products as an input can also be challenging because it can be infeasible or impossible to implement a sensor that is safe, cost effective, and able to withstand the operating environment of a smoke unit.

Inductive loads such as shaded-pole motors are used to operate various types of devices such as exhaust fans, cooling fans, table fans, hairdryers, relays, and air conditioners. Shaded-pole motors are often coupled with Triodes for Alternating Currents (TRIACs) to modulate the operating speed of fans primarily because these motors are robust, cost effective, and reliable. However, the performance of these motors is adversely affected by several factors such as, e.g., variations in supply voltages, a low power factor, low initial torque when devices are turned on, inefficiency due to the presence of a shading coil, and so forth.

Accordingly, there remains a need for improved systems and methods for ignition of a smoke unit fuel source and improving the accuracy with which the operating speeds of various devices are modulated based on power delivered to the motors of these devices.

SUMMARY

A cooking device, a smoke unit, and methods of cooking food using a cooking device with a smoke unit are provided. Related apparatuses and techniques are also described.

In one aspect, a cooking device is provided and can include a housing having a base defining a hollow cooking chamber and a movable cover coupled to the base. The movable cover can be configured to cover an opening in the housing to the hollow cooking chamber. In some embodiments, the movable cover can be in the form of a lid or door. The cooking device can also include a smoke unit coupled to the housing, and the smoke unit can include a fuel box defining an interior chamber in fluid communication with the hollow cooking chamber. The smoke unit can also include an igniter proximate the fuel box and configured to ignite fuel contained in the fuel box. The cooking device can also include an electronic controller in operable communication with the igniter. The electronic controller can be configured to determine an average rate of energy supplied to the igniter during a predetermined period of time of activation of the igniter and during an initial ignition operating mode of the igniter, determine an average temperature of a region proximate the igniter during the predetermined period of time, and adjust a maximum time of activation of the igniter when the igniter is operating in the initial ignition operating mode during a subsequent period of time following the predetermined period of time based on the determined average rate of energy and the determined average temperature. In some embodiments, the electronic controller can be configured to adjust the maximum time of activation of the igniter based on an operating mode of the smoke unit.

While the cooking device can have a variety of configurations, in some embodiments, the cooking device can include a fan coupled to the housing, in fluid communication with the fuel box, and in operable communication with the electronic controller, and the electronic controller can be configured to adjust an amount of power delivered to the fan during the initial ignition operating mode. In some embodiments, the electronic controller can be configured to adjust the amount of power delivered to the fan when a difference between a temperature of the region proximate the igniter and a temperature of air within the hollow cooking chamber is less than or equal to a predetermined temperature difference threshold. In some embodiments, the electronic controller can be configured to adjust the amount of power delivered to the fan when the temperature of the air within the hollow cooking chamber is less than a predetermined temperature threshold. In some embodiments, the electronic controller is configured to adjust the amount of power delivered to the fan when the rate of energy supplied to the igniter is less than a predetermined threshold. In some embodiments, the movable cover can be in the form of a lid or door.

In another aspect, a system is provided and can include at least one data processor and memory storing instructions, which when executed by the at least one data processor, cause the at least one data processor to perform operations including receiving data characterizing a plurality of measurements of a rate of energy supplied to an igniter of a smoke unit and of a temperature of a region proximate the igniter, each of the plurality of measurements acquired during a predetermined period of time during which the igniter is activated and during an initial ignition operating mode of the igniter; determining, based on the received data, an average rate of energy supplied to the igniter during the predetermined period of time and an average temperature of the region proximate the igniter during the predetermined period of time; determining, based on the determined average rate of energy supplied to the igniter and the determined average temperature of the region proximate the igniter, a maximum time of activation of the igniter when the igniter is operating in the initial ignition operating mode; determining whether a total length of time during which the igniter is activated exceeds the maximum time of activation; and causing the igniter to deactivate in response to determining that the total length of the time exceeds the determined maximum time of activation.

One or more of the following features can be included in any feasible combination. For example, the operations can further include receiving second data characterizing an operating mode of the smoke unit, and the maximum time of activation can be determined based on the received second data. For example, the operations can further include receiving third data characterizing a temperature of the air within a hollow cooking chamber in fluid communication with the smoke unit, and determining, based on the received third data, whether the hollow cooking chamber is in a cold temperature state. For example, the operations can further include receiving fourth data characterizing a temperature of the region proximate the igniter; and the determining of whether the smoke unit is in a cold temperature state can include determining whether a difference between the temperature of the region proximate the igniter and the temperature of the air within the hollow cooking chamber is less than or equal to a predetermined temperature difference threshold. For example, the determining of whether the smoke unit is in a cold temperature state can include determining whether the temperature of the region proximate the igniter is less than a predetermined temperature threshold. For example, the determining of whether the smoke unit is in a cold temperature state can include determining whether the temperature of the air within the hollow cooking chamber is less than the predetermined temperature threshold. For example, the operations can further include in response to determining that the smoke unit is in a cold temperature state, determining instructions for operating a fan in fluid communication with the smoke unit in a fan compensation mode; and providing the instructions to a controller of the fan to cause the fan to operate in the fan compensation mode.

In another aspect, data characterizing a plurality of measurements of a rate of energy supplied to an igniter of a smoke unit and of a temperature of a region proximate the igniter can be received. Each of the plurality of measurements can be acquired during a predetermined period of time during which the igniter is activated and during an initial ignition operating mode of the igniter. An average rate of energy supplied to the igniter during the predetermined period of time and an average temperature of the region proximate the igniter during the predetermined period of time can be determined based on the received data. A maximum time of activation of the igniter when the igniter is operating in the initial ignition operating mode can be determined based on the determined average rate of energy supplied to the igniter and the determined average temperature of the region proximate the igniter. Whether a total length of time during which the igniter is activated exceeds the maximum time of activation can be determined. The igniter can be deactivated in response to determining that the total length of the time exceeds the determined maximum time of activation.

One or more features can be included in any feasible combination. For example, second data characterizing an operating mode of the smoke unit can be received, and the maximum time of activation can be determined based on the second received data. For example, third data characterizing a temperature of the air within a hollow cooking chamber in fluid communication with the smoke unit can be received, and whether the smoke unit is in a cold temperature state can be determined based on the received third data. For example, fourth data characterizing a temperature of the region proximate the igniter can be received, and the determining of whether the smoke unit is in a cold temperature state can include determining whether a difference between the temperature of the region proximate the igniter and the temperature of the air within the hollow cooking chamber is less than or equal to a predetermined temperature difference threshold. For example, the determining of whether the smoke unit is in a cold temperature state can include determining whether the temperature of the region proximate the igniter is less than a predetermined temperature threshold. For example, the determining of whether the smoke unit is in a cold temperature state can include determining whether the temperature of the air within the hollow cooking chamber is less than the predetermined temperature threshold.

In one aspect, a device is provided and can include a power sensor, a temperature sensor, a triode for alternative current (TRIAC), an inductive load, and an electronic controller that includes memory. The TRIAC can be in operable communication with the electronic controller and the inductive load. The power sensor is in operable communication with the electronic controller and is configured to detect data representative of an electrical value. The electronic controller is configured to access, from the memory, a target value for the inductive load based on the electrical value, implement a transfer function based algorithm for determining a set point value using the electric value, apply the set point value on the TRIAC, and adjust operation of the inductive load to the target power responsive to the application of the set point value on the TRIAC, the operation of the inductive load at the target power causes the operation of the inductive load at the target value.

In some embodiments, the device may further comprise a fan including at least one fan blade that is operably coupled to the inductive load. In some embodiments, the inductive load can be a shaded-pole motor that controls rotational speed of the at least one fan blade disposed on the fan. Further, the implementing of the transfer function based algorithm can be based on at least one transfer function. The at least one transfer function can be based on a linear relationship between a plurality of power values of the inductive load at the electrical value and a plurality of speeds of the inductive load the electrical value. It is noted that the target value is a target speed.

The at least one transfer function enables mapping a plurality of speeds of the inductive load relative to the electrical value with the plurality of power values at the electrical value. The target speed is included in the plurality of speeds and the target power is included in the plurality of power values. The electrical value is a supply voltage, a current, or a power. In some embodiments, the adjusting of the operation of the inductive load can include increasing an amount of power delivered to the inductive load from a current power to the target power. In other embodiments, the adjusting of the operation of the inductive load can include decreasing an amount of power delivered to the inductive load from a current power to the target power.

In some embodiments, the electronic controller is further configured to determine, using the temperature sensor, a current temperature of the inductive load, compare the current temperature to a threshold temperature range, wherein the threshold temperature range is from 15° C. to 50° C., and initiate a starting condition compensation algorithm responsive to the current temperature being within the threshold temperature range or below the temperature threshold range. The initiation of the starting condition compensation algorithm can include applying a decaying value to a starting power, and driving the inductive load with the starting power, upon which the decaying value is applied, for a predetermined time frame.

In another aspect, a method implemented by a controller is provided and can include receiving an electrical value. Further, a target value for an inductive load that is based on the electrical value may be accessed by the controller via the memory of the controller, a transfer function based algorithm the set point value can be applied on a triode for alternating current (TRIAC). Additionally, operation of the inductive load may be adjusted responsive to the applying of the set point value on the TRIAC. The operation of the inductive load at the target power causes operation of the inductive load at the target value. In some embodiments, the inductive load can be a shaded-pole motor that is coupled to a fan.

In yet another aspect, a system is provided and can include a power source, a temperature sensor, a triode for alternative current (TRIAC), an inductive load, and at least one data processor that is communicatively coupled to the TRIAC. The at least one data processor can store instructions, which when executed by the at least one data processor, causes the at least one data processor to perform various operations. One or more of the following features can be included in any feasible combination. For example, the operations can include determining an electrical value, accessing a target value for the inductive load that is specific to the electrical value, implementing a transfer function based algorithm for determining a set point value using the electric value, applying the set point value on the TRIAC, and adjusting operation of the inductive load to the target power responsive to the applying of the set point value on the TRIAC, the operation of the inductive load at the target power causes operation of the inductive load at the target value.

In some aspects, the operations further comprise determining, using the temperature sensor, a current temperature of the inductive load, and comparing the current temperature to a threshold temperature range, wherein the threshold temperature range is from 15° C. to 50° C., and initiating a starting condition compensation algorithm responsive to the current temperature being within the threshold temperature range or below the temperature threshold range.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

These and other features will be more readily understood from the following detailed description taken in conjunction with the accompanying drawings, in which:

FIG. 4B is a rear perspective view of the smoke unit of FIG. 4A;

FIG. 4C is a side cross-sectional view of the smoke unit of FIG. 4A;

FIG. 4D is a partial cross-sectional view of the smoke unit of FIG. 4A;

FIG. 4F is an exploded view of the smoke unit of FIG. 4A;

Figure 1:
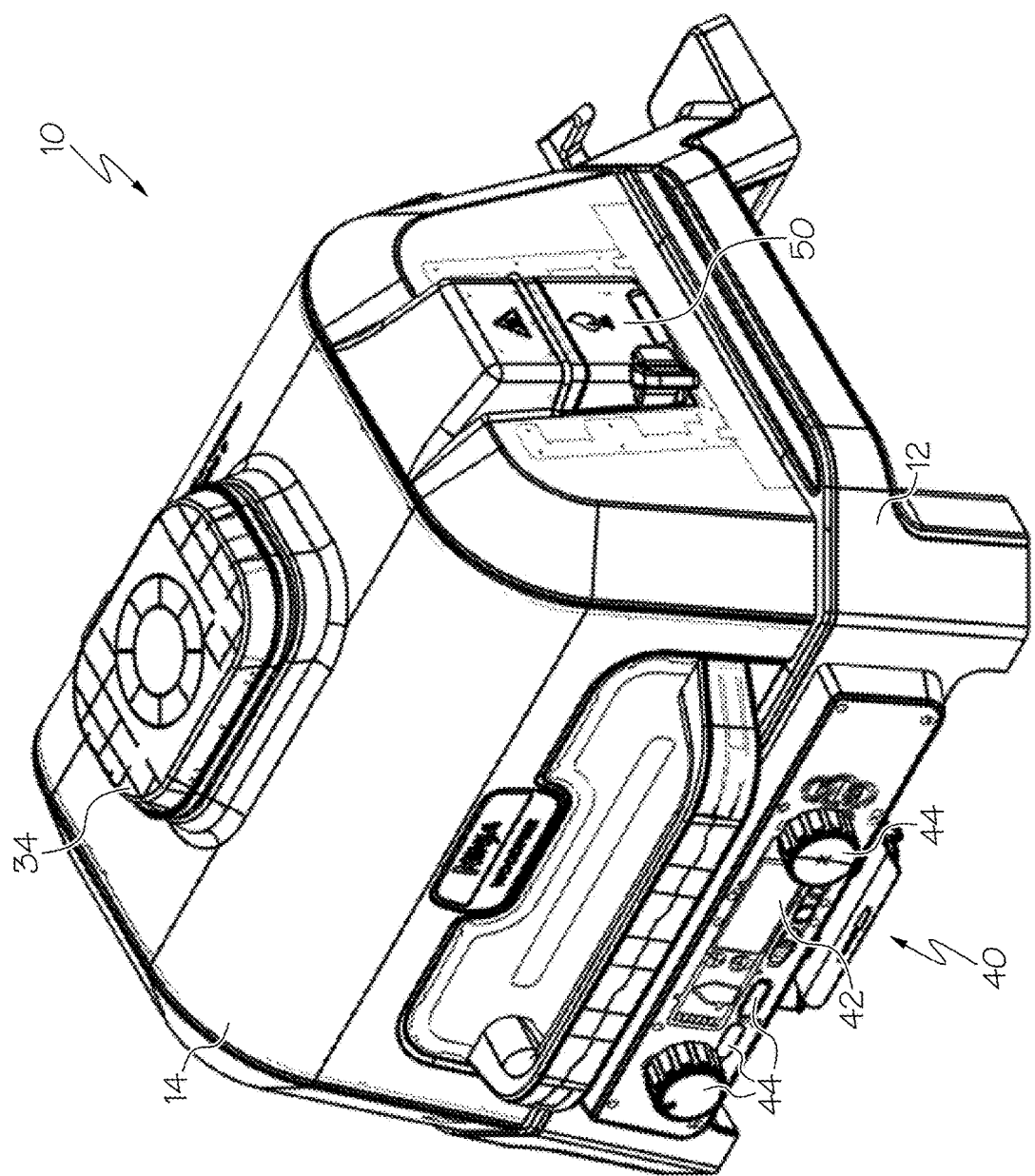
FIG. 1 is a front perspective view of a cooking device according to an embodiment.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings, and additional examples of specific system structures, functions, manufactures, uses, and related methods can be found in U.S. application Ser. Nos. 17/733,237, 17/663,582, 18/307,595, 18/307,583, and 18/079,781, each of which is incorporated by reference herein in its entirety Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, methods and systems for open-loop ignition of a smoke unit fuel source are provided. The open-loop ignition process can determine an average rate of energy supplied to the igniter during a predetermined period of time of activation of the igniter and during an initial ignition operating mode of the igniter. The open-loop ignition process can then determine an average temperature of a region proximate the igniter during the predetermined period of time adjust a maximum time of activation of the igniter when the igniter is operating in the initial ignition operating mode during a subsequent period of time following the predetermined period of time based on the determined average rate of energy and the determined average temperature. After the maximum time of activation has elapsed, the igniter can be deactivated.

In addition to describing methods and systems for open-loop ignition of a smoke unit fuel source, the present disclosure also describes methods and systems for controlling the delivery of power to inductive loads. As stated above, devices that utilize inductive loads, e.g., shaded-pole motors, to control the operating speeds of fans disposed in these devices suffer from numerous drawbacks. The performance of shaded-pole motors are negatively impacted by supply voltage variations, a low power factor, and low initial torque during device activation.

The transfer function based power delivery system described herein addresses and overcomes these drawbacks. In particular, the system is implemented by a controller of a cooking device and operates to receive data representative of a supply voltage from a power source that is external to the controller. A power sensor that is communicatively coupled to the controller can operate to detect the supply voltage and route data representative of the supply voltage to the controller. The controller then accesses a target operating speed for the inductive load that is specific to the supply and implements a transfer function based algorithm to determine a set point value using the electric value. In particular, the controller then determines a set point value specific to a target power and the supply voltage that is delivered to the device in which the controller is disposed. The controller applies the set point value to a TRIAC of the device and adjusts the operation of the inductive load to the target power based on the application of the set point value. The operation of the inductive load at the target power ensures that the inductive load operates at the target operating speed.

The use of the transfer function based algorithm, which includes one or more transfer functions to control the operating speeds of motors, provides various benefits. Specifically, the use of transfer functions improves the amount of mechanical rotational energy (output consistency) generated by the shaded-pole motors and the accuracy with which the operating speeds of these motors are modulated. The system described herein also provide these devices with power compensation and regulation under various conditions, e.g., during initiation (e.g., starting) of a device from an inactive or "cold" state. Additionally, the use of transfer functions enables efficient use of memory because these transfer functions can be approximated and solved using a set of polynomial expressions.

Figure 2:
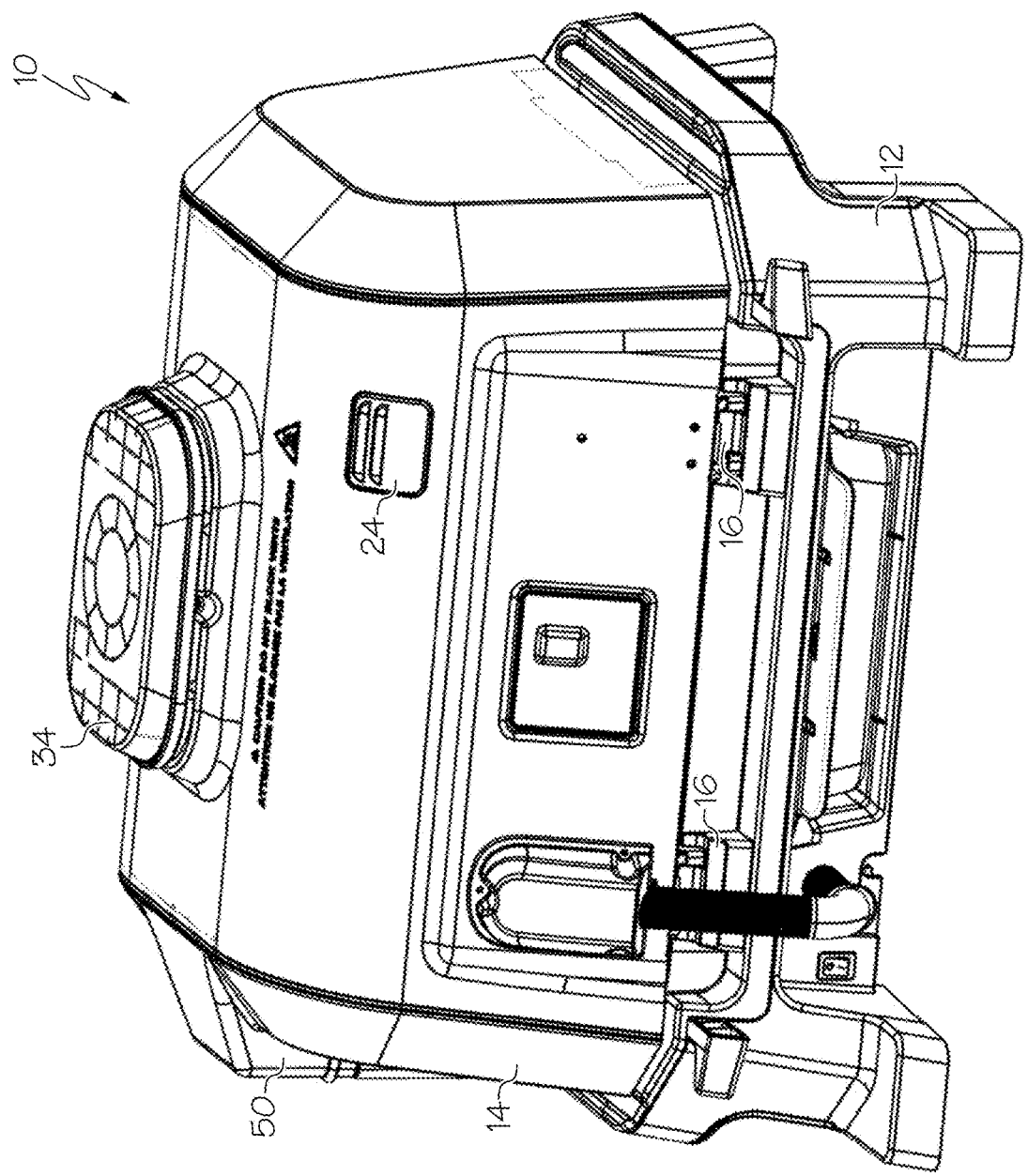
FIG. 2 is a rear perspective view of the cooking device of FIG. 1.

FIGS. 1-2 illustrate a cooking device 10 according to an embodiment and for use in some implementations of the current subject matter. The cooking device 10 can be used to cook food in a variety of cooking modes, including conductive and convective modes (e.g., sauté, grill, bake, air fry, dehydrate, roast, broil, etc.). The cooking device 10 includes a base 12 and a movable cover, such as a lid 14, movably coupled to the base 12, such as via a hinge 16. Together, the base 12 and the lid 14 can be referred to generally as a housing and can define an interior cooking chamber 20 that is sized to receive a variety of food products and/or food containers (e.g., a baking tray, a rack, etc.). A seal 15 can be located at a perimeter of the base 12 and/or the lid 14 to assist in sealing the interior cooking chamber 20 at the point of connection between the base 12 and the lid 14 when the lid 14 is in a closed position. The seal 15 can generally operate like a gasket and can be any material capable of operating as a seal, as would be known by a person skilled in the art. For example, the seal 15 can be rubber, plastic, fiberglass, metal, or any other material.

The base 12 can include a cooking surface 18 upon which a food product can be placed during an operating procedure of the cooking device 10, such as a grill or griddle surface, cooking stone (e.g., pizza stone, and the like), a wire rack, or another type of platform. The cooking device 10 can include at least one heating element disposed in the lid 14, the base 12, and/or the interior cooking chamber 20 that is configured to heat the cooking surface 18, the interior cooking chamber 20 and/or the food product through conduction, convection, radiation, or a combination thereof. In some variations, the cooking device 10 can include a first heating element 22A disposed beneath the cooking surface 18 and a second heating element 22B disposed in the lid 14. The cooking device 10 can also include at least one vent 24 located within the lid 14 and/or the base 12 to allow airflow to exit the interior cooking chamber 20. The vent 24 can be seen at least in FIG. 2 located on a rear of the cooking device 10. As a result of the seal 15 located around a perimeter of the base 12 and/or the lid 14, the vent 24 can be the primary (or the only) airflow exit for the interior cooking chamber 20. Accordingly, the size of the vent 24 can proportionally drive airflow through the cooking device 10.

The cooking device 10 can also include a fan 30, which can be operated to circulate air within the interior cooking chamber 20 during a variety of cooking modes. The fan 30 can be located within the interior cooking chamber 20, and can be coupled to the lid 14, the base 12, or any other portion of the cooking device 10. For example, in some embodiments, the fan 30 is located on an upper region of the interior cooking chamber 20 and can be configured to rotate about a vertical axis. A motor 32 capable of driving the fan 30 can be located within a motor housing 34 externally of the interior cooking chamber 20. In some variations, the fan 30 can be located external to the interior cooking chamber 20 and can be in fluid communication with the interior cooking chamber 20 through an air pathway, such as a ventilation system or the like.

The cooking device can include a user interface 40 located on an external portion of the cooking device 10, such as on a front face of the base 12, as seen, for example, in FIG. 1. The user interface 40 can include a screen 42 and a variety of inputs 44 with which a user can select various parameters for a cooking and/or a smoke process for a food product. The user interface 40 can include a variety of pre-programmed operating modes. These cooking modes can include conductive, convective, and radiative heating modes, such as grilling, baking, air frying, dehydrating, broiling, and other known cooking modes. Further, these cooking modes can combined with smoke generated by a smoke unit 50 as explained in further detail below. Smoke can be introduced from the smoke unit, and can include low-and-slow modes to impart smoke over a longer period of time and perfume smoke to impart smoke flavor over a short period of time. Further, smoke can be imparted onto a food product independent of a cooking mode, such that the food product may be imparted with smoke flavor without being cooked. Any of the listed operations can be used in combination with one another, both in succession or at the same time.

The cooking device 10 can also employ a smoke unit 50 coupled to the cooking device 10 to impart smoke flavor onto a food product in any mode. The smoke unit 50 is described in further detail below and with respect to FIGS. 4A-4F. The smoke unit 50 can be coupled internally or externally to the cooking device 10, such as to the base 12, the lid 14, or anywhere else on the cooking device. The smoke unit 50 can receive a fuel source, such as wood pellets, and can ignite the pellets using a heating element to generate smoke to impart flavor onto a food product contained within the interior cooking chamber. The generation of smoke can occur during a cooking mode to impart smoke flavors. Further, the cooking device 10 can employ the smoke unit 50 independent of a cooking mode in order to impart smoke flavor to a food product without cooking the food product. The smoke unit 50 can also include an intake located on an exterior thereof, which can provide the cooking device 10 with a source of new air to feed a smoke generation process and allow for air to circulate within the interior cooking chamber 20. The intake can be intentionally and deliberately sized to correspond to a size of the vent 24 located on the lid 14 and/or the base 12 of the cooking device such that the amount of airflow exiting the interior hollow chamber is approximately equal to the amount of airflow entering the intake.

The cooking device 10 can also employ a smoke channel to introduce smoke generated by the smoke unit into the interior cooking chamber. The smoke channel can provide a pathway through which generated smoke can be drawn, by operation of the fan, into the interior cooking chamber in order to impart smoke flavor onto a food product. Further, the smoke channel can also form part of an airflow pathway that begins with the intake of the smoke unit 50 and ends with the vent 24. The smoke channel can come in a variety of forms, as will be discussed below.

Figure 3A:
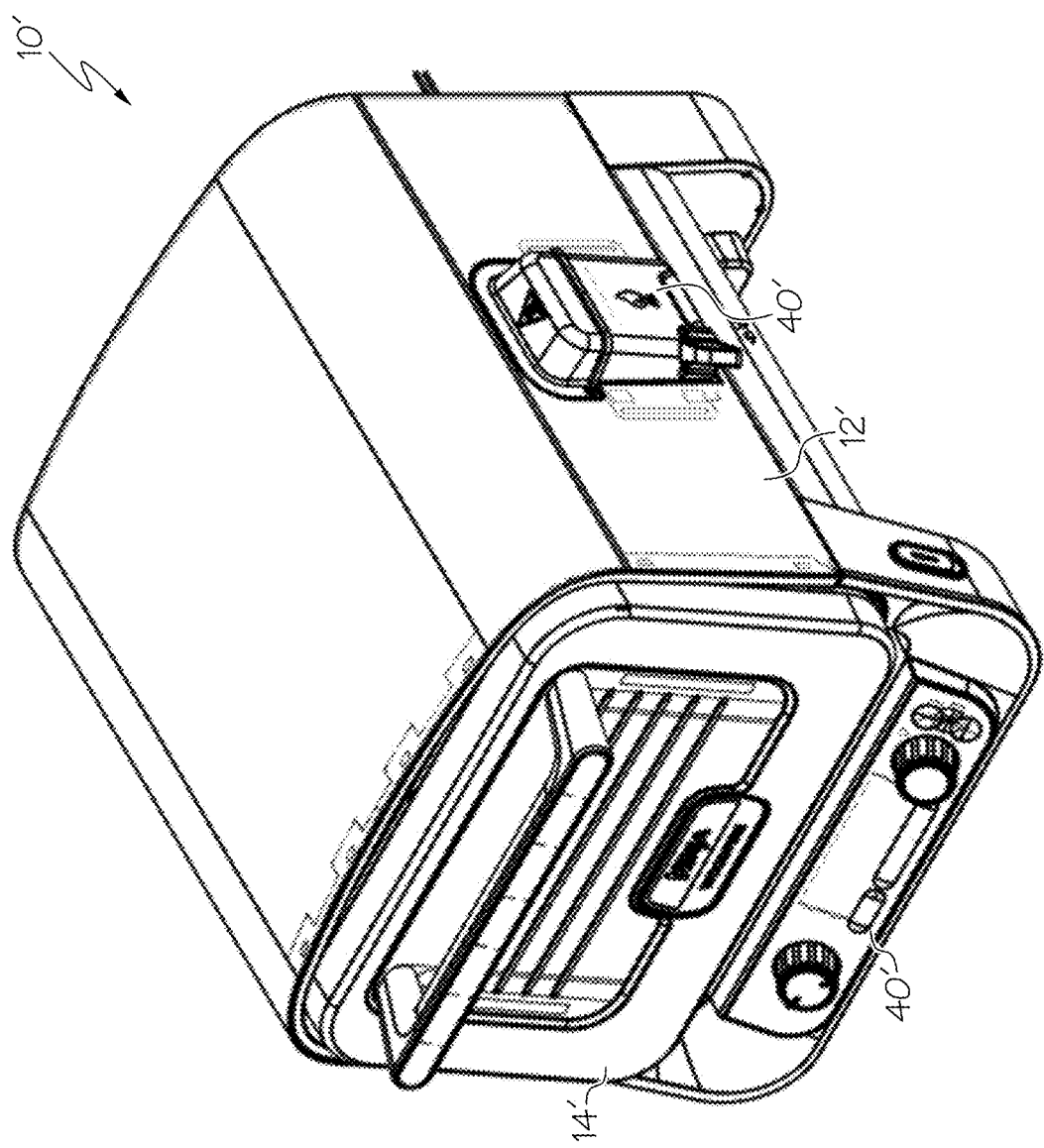
FIG. 3A is a perspective view of another embodiment of a cooking device.
Figure 3B:
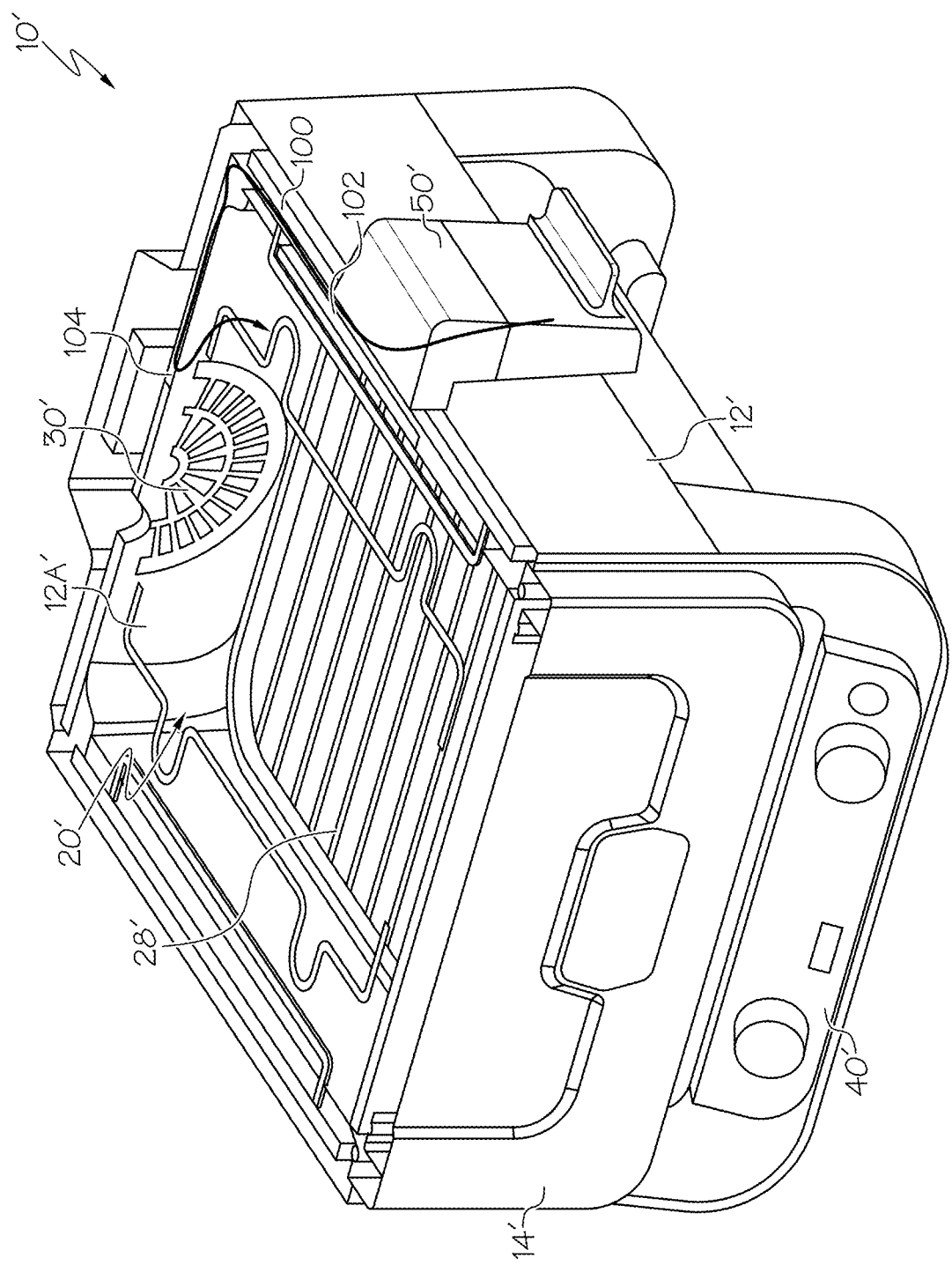
FIG. 3B is a cross-sectional view of the cooking device of FIG. 3A.

FIGS. 3A and 3B depict another embodiment of a cooking device 10'. The illustrated cooking device 10' can be generally similar to cooking device 10, and for brevity, similar components will not be described again. For example, the cooking device 10' can generally include a housing 12', a smoke unit 50', a fan 30', and a user interface 40'. However, in this embodiment the cooking device 10' includes a movable cover that is in the form of a door 14' that can be pivoted open on the front of the cooking device. Further, an exemplary difference between the cooking device 10' and the cooking device 10 is the location of the fan 30' on the cooking device 10'. As shown in FIG. 3B, the fan 30' is located on a rear wall 12A' of the interior cooking chamber 20', rather than on a ceiling or upper region of the interior cooking chamber 20'. Generally, the fan 30' can be located on a wall of the interior cooking chamber 20' opposite the front and the movable door 14'. In this arrangement, the fan 30' can rotate about a horizontal axis, but the fan 30' generally operates in a similar manner as the fan 30. The smoke channel 100 can be seen in the right side of the housing 12', and the smoke channel 100 can be at least partially defined by the housing 12', similar to the form of the smoke channel 100. The smoke channel 100 can lead from the smoke unit 50' at a first end 102 thereof to the fan 30' at a second end 104 thereof. Despite the difference in arrangement between the cooking device 10 and the cooking device 10', the principle of operation of the smoke channel 100 is generally the same in each device. Accordingly, although reference is made herein to the cooking device 10, descriptions are equally applicable to the cooking device 10'.

As referenced above, FIGS. 4A-4F illustrate an exemplary embodiment of a smoke unit, such as the smoke unit 50 described above, that can be used in some implementations of the current subject matter. Generally, the smoke unit 50 is configured to generate smoke for use in a cooking operation. The smoke unit 50 can be mounted to an exterior surface of the movable cover, such as lid 14, and is configured to be in fluid communication with the interior cooking chamber 20 via a lid aperture 18d. While the smoke unit 50 is described herein as being mounted to components of the cooking device 10 and the cooking device 10', in some embodiments, the smoke unit 50 can be coupled to additional types of cooking devices, such as a propane grill configured to cook food with a propane-fueled heat source. For example, in some embodiments, the smoke unit 50 can be similarly mounted to an exterior surface of such a propane grill and configured to be in fluid communication with an interior cooking chamber of the propane grill, in which food is placed for cooking, via an aperture formed in the exterior surface.

The smoke unit 50 can include a smoke unit housing 52 having a generally rectangular configuration with top and bottom surfaces 52a, 52b, and four sides—narrower left and right sides 52c, 52d, and wider front and rear sides 52e, 52f— that together form an interior cavity 54. As shown in FIGS. 4A-4F, the front side 52e, proximate the base 12, is formed to fit a contour of the outer surface of the lid 14, and therefore may be shorter than the rear side 52f. The rear side 52f, opposite the front side 52e, may include a first air intake 56a disposed at a lower region to allow air into the interior cavity 54. The top surface 52a includes a lid 58 hinged to the smoke housing 52 that leads to the interior cavity 54. In some embodiments, the lid 58 is biased to a closed position via a spring 58a with enough force to prevent accidental opening, or to prevent excess air from seeping into the interior cavity 54. The interior cavity 54 is sized to receive an insertable removable fuel box assembly 60 therein. In some embodiments, the force exerted by spring 58a is large enough to prevent the fuel box assembly 60 from sliding out of the smoke unit housing 52 when the lid 14 is in an open position.

The fuel box assembly 60 can be configured to receive and retain fuel for use during a cooking operation, and the fuel box assembly 60 can also catch and hold ash generated by combustion of the fuel. The fuel box assembly 60, seen within the smoke unit housing 52 in FIG. 4C and removed from the smoke unit housing 52 in FIG. 4F, includes left and right sidewalls 60a, 60b, and front and rear sidewalls 60c, 60d, which are wider than the left and right sidewalls 60a, 60b similar to the smoke unit housing 52. The fuel box assembly 60 also includes a top surface 60e and a bottom surface 60f which extend between the sidewalls 60a-d at respective top and bottom ends. The particular shape and arrangement of the fuel box assembly 60 can vary in dimension, and certain features can be rounded or generally altered from what is depicted. The front sidewall 60c, disposed proximate the housing 52, is shown covered by a mesh 64 with a plurality of small apertures 62a disposed thereon. At an upper region of the front sidewall, beyond the mesh, the smoke unit further includes a large aperture 62b. The particular amount and arrangement of apertures 62a, 62b can vary in number, arrangement, and/or dimension. The rear sidewall of the fuel box assembly 60 is substantially solid, except for at a lower region, which can contain a second air intake 56b that aligns with the first air intake 56a located on the rear sidewall of the smoke unit housing 52. The first and second air intakes 56a, 56b define a portion of an airflow path through the cooking device 10.

The fuel box assembly 60 is further configured to be placed within the smoke unit housing 52 to substantially conform with the left, right, and rear sides. A region near the front side of the smoke unit housing 52 proximate the upper lid portion can be larger than a region occupied by the fuel box assembly 60, and is thus not filled by the fuel box assembly 60 when the fuel box assembly 60 is inserted into the smoke unit housing 52. As shown in FIGS. 4A-4F, this region can contain an igniter 66, such as a wire heating element, that is configured to heat fuel contained in the fuel box assembly 60 through the smaller apertures 62a of the mesh 64 on the front fuel box assembly sidewall 60e. In various embodiments, the igniter 66 can take on various forms, such as, for example, an electrical tubular heating element having a first terminal end at one end of the heating element and a second terminal end at an opposite end of the heating element, or a sparking device. When smoke generation is required for a cooking operation, the igniter 66 can be powered on to ignite fuel contained in the fuel box assembly 60.

As further shown in FIGS. 4A-4F, the fuel box assembly 60 has an interior space. This interior space is divided into two regions, an upper region in the form of a pellet box 68 that is configured to receive and hold fuel for use during a smoke generation process, and a lower region in the form of an ash catcher 70 that is configured to receive and store ash created during a smoke generation process. The pellet box 68 and the ash catcher 70 are shown in the illustrated embodiment as being separated by a mesh divider 72. The mesh divider 72 includes apertures which are sized to be large enough to allow for ash to fall from the pellet box 68 to the ash catcher 70 during a smoke generation process, while also being small enough to prevent fuel from passing through the mesh divider 72. The ash catcher 70 is further configured to retain ash generated by the fuel box assembly 60, such that removal of the fuel box assembly 60 from the smoke unit housing 52 will also remove ash from the smoke unit housing 52 to facilitate disposal and prevent ash spillage. A person skilled in the art will appreciate that other techniques can be used to separate ash from the fuel.

In some embodiments, and as depicted in the FIGS. 4A-4F, the smoke unit 50 can include a temperature sensor 74 disposed proximate to the igniter 66. The temperature sensor 74 can take on any suitable form, and, for example, may be one of a thermocouple, a resistance temperature detector (RTD), a thermistor, and a semiconductor based integrated circuit. However, any form of sensor capable of measuring temperature can be used. The temperature sensor 74 is configured to measure a temperature of the interior of the fuel box assembly 60 during smoke processes and non-smoke processes.

Figure 4A:
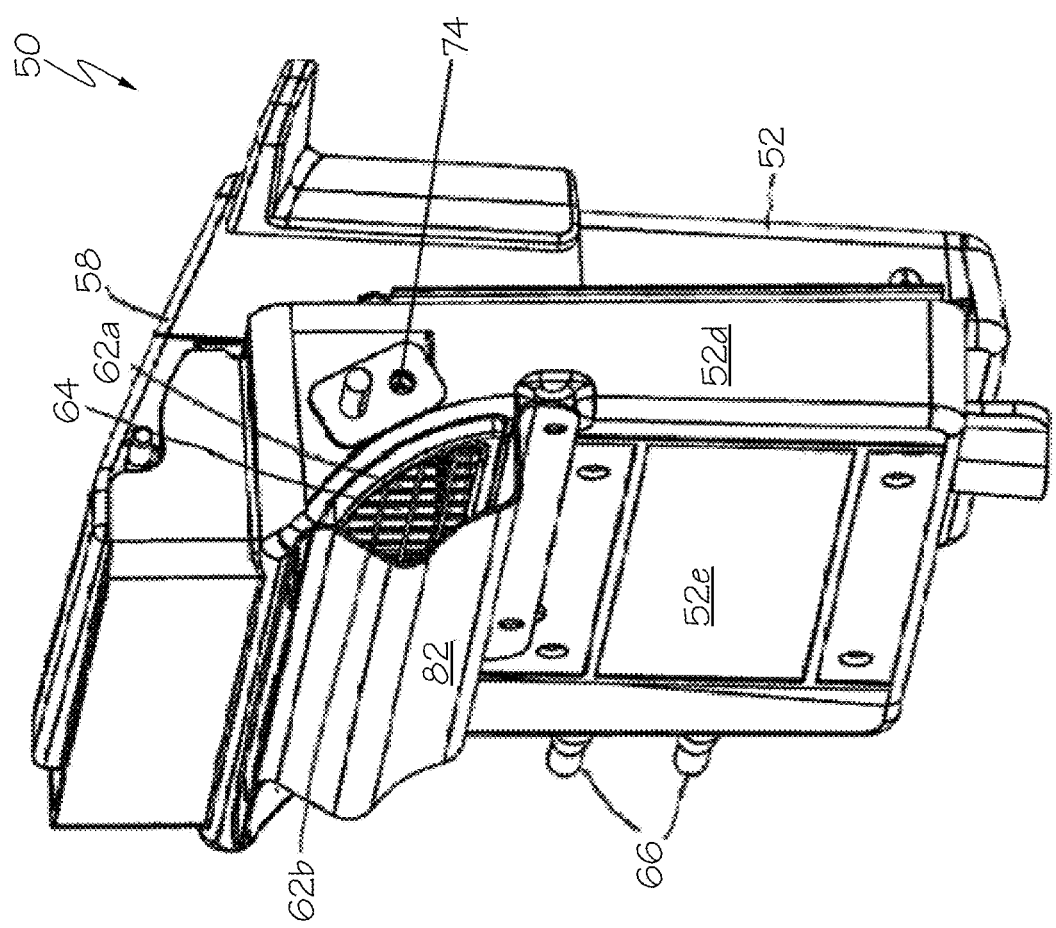
FIG. 4A is a side perspective view of the exemplary smoke unit for use with embodiments of the cooking devices described herein.
Figure 4E:
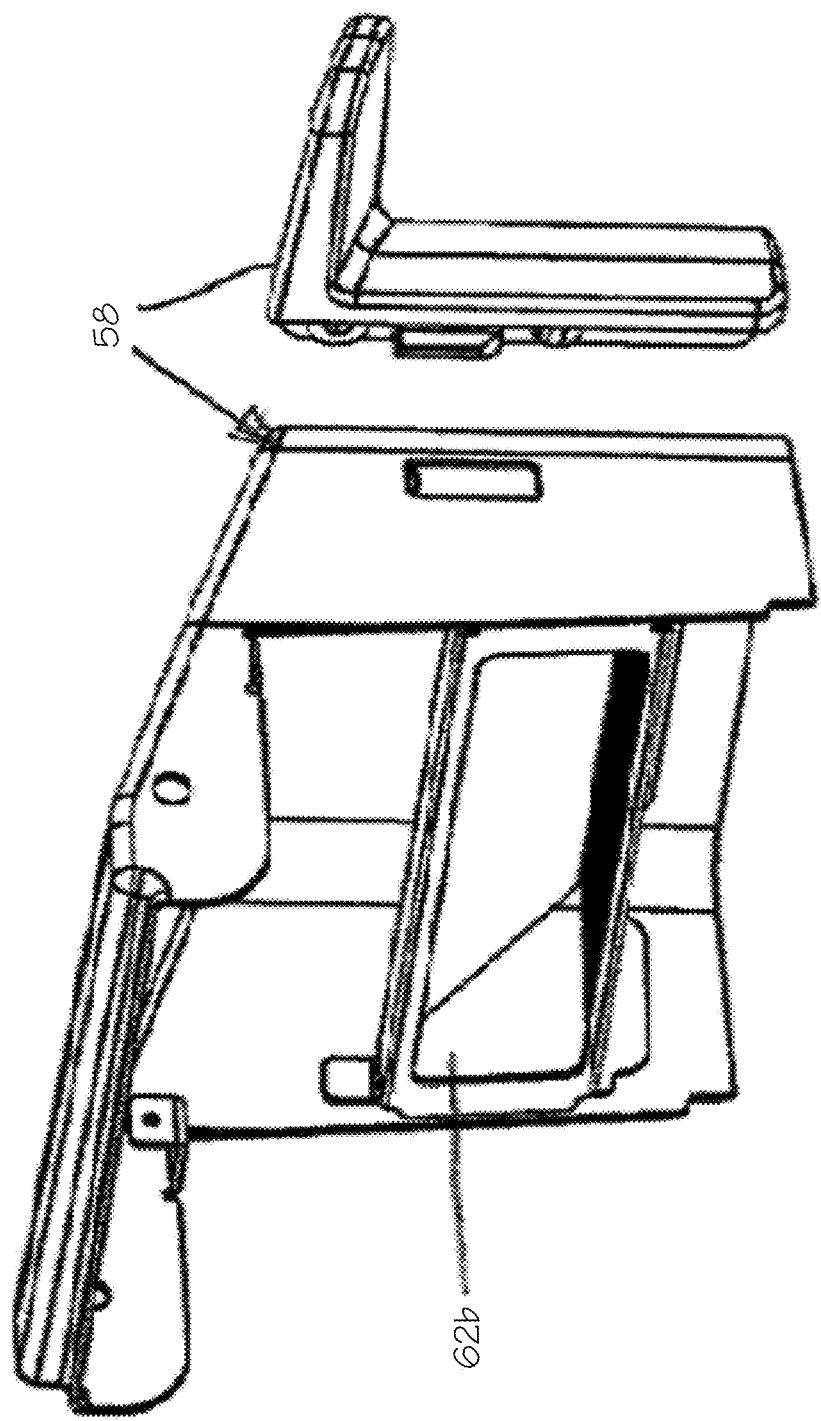
FIG. 4E is a side perspective view of a lid of the smoke unit of FIG. 4A.

The smoke unit interior 54, including the interior of both the smoke unit housing 52 and the fuel box assembly 60, are in fluid communication with the interior cooking chamber 20. As mentioned previously, and as shown especially in FIG. 4C, the front sidewall of the smoke unit 50, above the region containing the igniter 66, contains a large aperture 62b. The large aperture 62b defines part of the airflow pathway, joining the smoke unit 50 interior with the interior cooking chamber 20. Covering the large aperture 62b, as depicted in FIGS. 4A-4C, is a baffle 80 disposed in the airflow path. When the smoke unit 50 is coupled to the cooking device 10 at the lid aperture 18d, the baffle 80 passes through the lid aperture 18d and is thereby positioned within the interior cooking chamber 20.

In the embodiment shown in FIGS. 4A-4F, the baffle 80 is a tunnel baffle 82. The tunnel baffle 82 can include a cover 82c spanning the large aperture 62b that is oriented horizontally to align with a direction of airflow in the interior cooking chamber 20. The cover 82c can include openings at each end thereof such that, in relation to airflow through the interior cooking chamber 20, one opening is an upstream opening 82a and the other opening is a downstream opening 82b.

Figure 5:
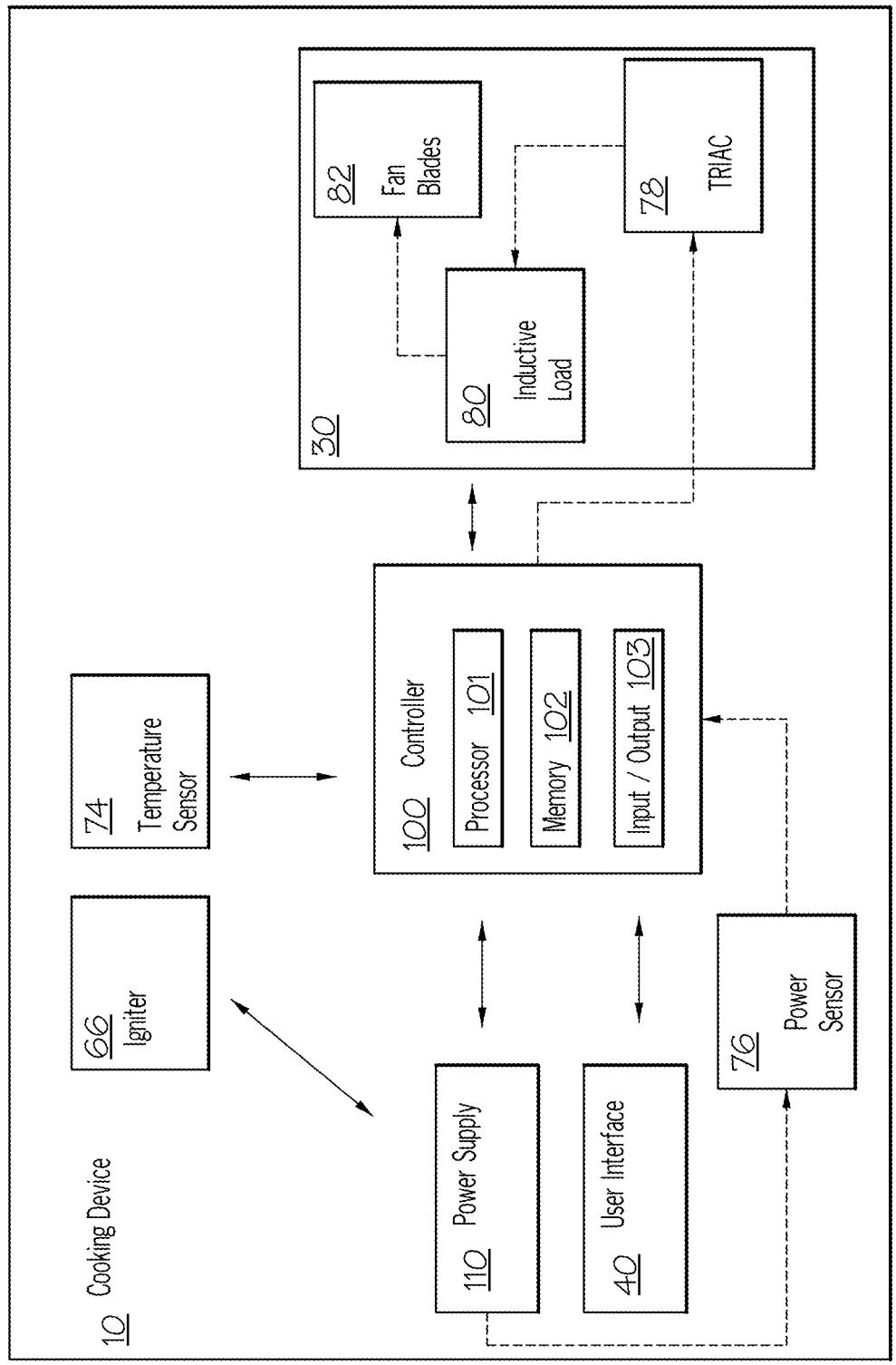
FIG. 5 is a schematic diagram illustrating components of the cooking device of FIG. 1A.

As schematically illustrated in FIG. 5 and as referenced above, the cooking device 10 can include a controller 100 that is in operable communication with one or more of the components described above (e.g., the user interface 40, the fan 30, the temperature sensor 74, etc.). As shown, the controller 100 can include at least one processor 101 and a memory 102 storing instructions which, when executed by the processor 101, can cause the at least one data processor to perform one or more of the operations described else-where herein. The controller 100 can also include an input/output (I/O) interface 103 that enables the processor 101 to receive commands and/or data from other components of the cooking device 10 for use in performing the operations.

As shown in FIG. 5, the cooking device 10 can also include a power supply 110 that is configured to supply power to the igniter 66 (in addition to other components of the cooking device 10 requiring power to operate). The power supply 110 can be in operable communication with the controller 100 and the igniter 66. As such, the power supply 110 can be configured to receive commands from the controller 110 (provided via the I/O interface 103) that cause the power supply 110 to provide electrical power to the igniter 66 to thereby cause the igniter 66 to activate. In some embodiments, the power delivered to the igniter 66 can vary based on the commands received from the controller 65. For example, the level and/or duration of power supplied to the igniter 66 can vary over a given period of time based on power delivery instructions characterized by the commands received from the controller 100. As a result, the level and/or duration of heat being supplied to the fuel contained within the smoke unit 50 can vary over the given period of time based on the commands received from the controller 100.

In some embodiments, the activation of the igniter 66 can occur when an ignition mode is selected via the user interface 40. When this occurs, the controller 100 can cause the power supply 110 to supply full power to the igniter 66.

In some embodiments, the controller 100 can be configured to receive data characterizing a plurality of measurements of a rate of energy (e.g., power, etc.) that is supplied to the igniter 66 of the smoke unit 50 by the power supply 110 and a plurality of measurements of a temperature of a region proximate the igniter 66 as acquired by the temperature sensor 74. Each of the plurality of measurements can be acquired at regular intervals during a predetermined period of time (e.g., every second over a 30 second period of time). In some embodiments, the predetermined period of time can be a period of time during which the igniter 66 is activated and/or during an initial operating mode of the igniter 66 (e.g., an operating mode during which the igniter 66 is used for the first time since the cooking device has been powered on). In some embodiments, each of the plurality of measurements of the rate of energy can be acquired with a power sensor (not shown) that is configured to measure the rate of energy supplied to the igniter 66 by the power supply 110.

In some embodiments, each of the plurality of measurements of the rate of energy supplied to the igniter 66 can be derived from a measurement of voltage applied to the igniter 66 and a measurement of a resistance of the igniter 66. For example, in some embodiments, measurements of the voltage applied to the igniter 66 can be acquired with a voltage sensor (not shown) that is configured to acquire a value of the voltage, and measurements of the resistance of the igniter 66 can be acquired with a resistance sensor (not shown) that is configured to acquire an amount of resistance of the igniter 66. Each of the plurality of measurements of the rate of energy supplied to the igniter 66 can be derived using the equation $P=V^2/R$, where P is the measurement of the rate of energy supplied to the igniter 66, V is the measured voltage, and R is the measured resistance. In some embodiments, each of the plurality of measurements of the rate of energy supplied to the igniter 66 can be derived using an assumed value of resistance of the igniter 66 in lieu of or in addition to using a measured value of resistance.

In some embodiments, each of the plurality of measurements of the rate of energy supplied to the igniter 66 can be derived from a measurement of current passing through the igniter 66. For example, in some embodiments, measurements of the current passing through the igniter 66 can be acquired with a current sensor (not pictured) that is configured to acquire a value of the current. Each of the plurality of measurements of the rate of energy supplied to the igniter 66 can be derived using the equation $P=I^2*R$, where P is the measurement of the rate of energy supplied to the igniter 66, I is the measured current, and R is the measured resistance. In some embodiments, each of the plurality of measurements of the rate of energy supplied to the igniter 66 can be derived using an assumed value of resistance of the igniter 66 in lieu of or in addition to using a measured value of resistance.

In some embodiments, each of the plurality of measurements of the rate of energy supplied to the igniter 66 can be derived from the measurement of current passing through the igniter 66 and the measurement of voltage applied to the igniter 66. For example, current and voltage measurements can be acquired using the current and voltage sensors described above, respectively, and each of the plurality of measurements of the rate of energy supplied to the igniter 66 can be derived using the equation $P=I*V$, where P is the measurement of the rate of energy supplied to the igniter 66, I is the measured current, and V is the measured voltage.

In some embodiments, at the conclusion of the predetermined period of time, the controller 100 can be configured to determine an average rate of energy supplied to the igniter 66 during the predetermined period of time. For example, the controller 100 can calculate an average of each of the received plurality of measurements of the rate of energy supplied to the igniter 66 during the predetermined period of time to determine an average rate of energy supplied to the igniter 66 during the predetermined period of time. Similarly, in some embodiments, the controller 100 can be configured to determine an average temperature of the region proximate the igniter 66 during the predetermined period of time. For example, the controller 100 can calculate, using each of the received plurality of measurements of the temperature of the region proximate the igniter 66, an average value of the temperature of the region proximate the igniter 66.

In some embodiments, the controller 100 can monitor the length of time during which the igniter 66 is activated. As such, the controller 100 can be configured to determine, based on the determined average rate of energy supplied to the igniter 66 and the determined average temperature of the region proximate the igniter 66, a maximum time of activation of the igniter when the igniter is operating in the initial ignition operating mode and during a subsequent period of time that follows the predetermined period of time. The controller 100 can be configured to adjust the maximum time of activation of the igniter 66 when the igniter 66 is operating in the initial ignition operating mode and during the subsequent period of time based on a variety of factors. For example, the controller 100 can adjust the maximum time of activation based on the determined average rate of energy and/or the determined average temperature. For example, the maximum time of activation can be determined using a weighted average algorithm in which the determined average temperature of the region proximate the igniter 66 and/or the determined average rate of energy supplied to the igniter 66 are provided as variables that are multiplied by negative value weight factors. As such, the determined maximum time of activation can vary inversely with the average temperature of the region proximate the igniter 66 and/or the determined average rate of energy supplied to the igniter 66.

In some embodiments, the maximum time of activation can be determined based on an average amount of voltage applied to the igniter 66 during the predetermined period of time. For example, the controller 100 can calculate an average of each of the received plurality of measurements of the voltage applied to the igniter 66 during the predetermined period of time to determine the average amount of voltage supplied to the igniter 66 during the predetermined period of time. The determined average amount of voltage applied to the igniter 66 can be used in lieu of or in addition to the determined average rate of energy supplied to the igniter 66 in determining the maximum time of activation in the manner described above. In some embodiments, the average amount of voltage applied to the igniter 66 can be used in lieu of the determined average amount of voltage supplied to the igniter 66 when the resistance of one or more heating elements in the cooking device 10 (e.g., igniter 66) is assumed to be the same value.

In some embodiments, the controller 100 can be configured to adjust the maximum time of activation of the igniter 66 based on an operating mode of the smoke unit 50. For example, the controller 100 can use a first algorithm for determining the maximum time of activation of the igniter 66 when the smoke unit 50 is being used in a smoker operating mode) (in which the smoke generator outputs smoke for an extended duration of time (e.g., a relatively long portion of, or all of, the time during which the food is cooked using the cooking device 10)) and/or a second algorithm for determining the maximum time of activation of the igniter 66 when the smoke unit 50 is being used in an infusion operating mode (in which the smoke generator outputs a limited-duration burst of smoke on an on-demand basis (e.g., a relatively short portion of the time during which the food is cooked with the cooking device 10)). The first algorithm and/or the second algorithm can be substantially similar to the weighted average algorithm described above (e.g., the determined average temperature of the region proximate the igniter 66 and/or the determined average rate of energy supplied to the igniter 66 are provided as variables to the first and second algorithms that are multiplied by negative value weight factors). However, the magnitudes of the negative value weight factors for each of the first algorithm and the second algorithm can differ based on the operating mode of the smoke unit 50.

In some embodiments, the controller 100 can be configured to adjust (e.g., increase or decrease) an amount of power delivered to the fan 30 during the initial ignition operating mode. In some embodiments, the controller 100 can receive, from a temperature sensor (not shown) located in the cooking chamber 20, data characterizing the temperature of the cooking chamber 20. The controller 100 can determine a difference between the temperature of the cooking chamber 20 and the temperature of the region proximate the igniter 66 characterized by one or more of the above-described plurality of measurements, and the controller 100 can determine whether the determined difference is less than or equal to a predetermined temperature difference threshold value (e.g., 6 degrees Celsius). Additionally, the controller 100 can be configured to determine whether the temperature of the region proximate the igniter 66 and the temperature of the cooking chamber 20 are each less than a predetermined temperature threshold. When the difference between the temperature of the cooking chamber 20 and the temperature of the region proximate the igniter 66 is less than or equal to the predetermined temperature difference threshold value, and when the temperature of the region proximate the igniter 66 and the temperature of the cooking chamber 20 are both less than a predetermined temperature threshold, the cooking device 10 is determined to be in a "cold state" at the beginning of the ignition process (e.g., a state in which the cooking device 10 has not been recently used and, as such, is not at a temperature that is close to the normal operating temperature of the cooking device 10).

As such, when the controller 100 determines that the cooking device 10 is in a "cold state," the controller 100 can operate the cooking device 10 in a fan compensation mode in which the amount of power delivered to the fan 30 is adjusted. The fan compensation mode can allow for optimized ignition of the fuel located in the smoke unit 50 when the cooking device 10 is in the "cold state." For example, in some embodiments, the controller 100 can cause an adjusted (e.g., increased or decreased) amount of power to be delivered to the fan 30 in order to compensate for internal friction that is present within the motor of the fan 30 when the cooking device is determined to be in the cold state (by, for example, determining that the temperature of the cooking chamber 20 is less than a predetermined threshold) and thereby maintain the operating speed of the fan at a rotational speed that allows for the optimized ignition of the fuel located in the smoke unit 50. As the temperature of the cooking chamber 20 increases, the internal friction abates and as such the controller 100 can deactivate the fan compensation mode in response to determining that the temperature of the cooking chamber 20 exceeds a predetermined threshold. For example, once the temperature of the cooking chamber 20 has increased such that the cooking device 10 is no longer in the cold state, the controller 100 can deactivate the fan compensation mode and adjust (e.g., increase or decrease) the amount of power delivered to the fan and thereby maintain the operating speed of the fan at the rotational speed that allows for the optimized ignition of the fuel located in the smoke unit 50. Additionally, in some embodiments, when the controller 100 is operating the cooking device 10 in the fan compensation mode, the controller 100 can monitor a level of voltage generated by the power supply 110 and determine whether the level of voltage is less than a predetermined threshold. In response to determining that the level of voltage generated by the power supply 110 is less than the predetermined threshold, the controller 100 can cause an increased amount of power to be delivered to the fan 30 to compensate for the level of voltage generated by the power supply 110 being less than the threshold and thereby maintain the operating speed of the fan at the rotational speed that allows for the optimized ignition of the fuel located in the smoke unit 50. After each of the operations of the fan compensation mode have concluded, the controller 100 can adjust (e.g., increase or decrease) the amount of power delivered to the fan 30 such that the operating speed of the fan 30 is adjusted to a preset value for ignition of the fuel within the smoke unit 50. After the operating speed of the fan 30 has been adjusted to the preset value, the controller 110 can continue to operate in the ignition mode until the maximum time of activation has elapsed.

In some embodiments, such as those where the fan compensation mode is not active or enabled, after the controller has determined the maximum time of activation and during the above-described subsequent period of time, the controller 100 can cause a maximum amount of power to be supplied to the fan 30, such that the fan 30 operates at full power, until a predetermined portion of the subsequent period of time has elapsed (e.g., 120 seconds). Once the predetermined portion has elapsed, the controller 100 can adjust the amount of power delivered to the fan such that the operating speed of the fan 30 is adjusted to the preset value described above. And, similar to the above-described functionality, after the operating speed of the fan 30 has been adjusted to the preset value, the controller 110 can continue to operate in the ignition mode until the maximum time of activation has elapsed.

The cooking device 100 also includes a power sensor 76 that is communicatively and operably coupled to the controller 100 and the power supply 110. In operation, the power supply 110 can receive a steady stream of voltage ("supply voltage") from an external power source such as an electrical outlet. For example, one end of a three pronged cord can be connected to the external power source and the other end may be directly connected to the power supply 110. Thereafter, when the cooking device 10 is activated (e.g., turned on), voltage in a range of 110 V to 120 V can be consistently delivered to the power supply 110 by the external power source. The power supply 110 uses the received voltage to drive current to several components of the cooking device 10, namely the controller 100. The driving or movement of the current by the received voltage results in the generation of electrical power, which operates various components of the cooking device 10.

In some embodiments, the power sensor 76 detects, substantially in real time, a supply voltage that is received by the power supply 110 and communicates data representative of the supply voltage to the controller 100. The controller 100 stores this data in memory 102. In some embodiments, the power sensor 76 can be configured to detect the supply voltage at fixed time intervals, at a predefined time, and so forth. The controller 100 utilizes the data representative of the supply voltage to perform calculations using, e.g., a transfer function based algorithm that utilizes one or more transfer functions. Details regarding the implementation of the transfer functions will be described later on in this disclosure. Broadly speaking, the controller 100 receives electric power from the power supply 110 and implements one or more transfer functions to deliver a precise amount of electric power to the fan 30. Controlling the amount of electrical power delivered to the fan 30 enables control over the operating speed of the fan, namely the rate of rotation of the blades of the fan 30.

FIG. 5 also schematically illustrates various components of the fan 30, namely a TRIAC 78, an inductive load 80, and fan blades 82. The TRIAC 78, a component that is in operable communication with the controller 100 and the inductive load 80, is a three-pinned electronic circuit used to control an amount of current that flows to a component, and by extension, the amount of power delivered to the component. TRIACs are used as dimmer switches for lighting components, output controllers for electric heaters, and as components that control the operating speed of motors. One such motor is a shaded-pole motor, which utilizes a magnetic field to convert electrical current into mechanical rotational energy. The shaded-pole motor, one example of the inductive load 80, is in operable communication with the TRIAC 78 and the fan blades 82. When the cooking device operates in fan compensation mode, the controller 100 can adjust the operating speed of the fan blades 82 by controlling the amount of electric power delivered to the shaded-pole motor.

For example, to increase the operating speed of the fan blades 82 relative to a current operating speed, the controller 100 can increase an amount of electric power delivered to the inductive load 80. Delivery of a higher electric power causes the inductive load 80 (e.g., the shaded-pole motor) to generate a higher amount of mechanical rotational energy which, when delivered by the inductive load 80 to the fan blades 82, increases the operating speed (i.e. rotational speed) of the fan blades 82. Conversely, to decrease the operating speed of the fan blades 82, the controller 100 can decrease an amount of power delivered to inductive load 80. A lower electric power causes the inductive load 80 (e.g., the shaded-pole motor) to generate a lower amount of mechanical rotational energy which, when delivered by the inductive load 80 to the fan blades 82, decreases the operating speed (i.e. rotational speed) of the fan blades 82 relative to the current operating speed.

Figure 6:
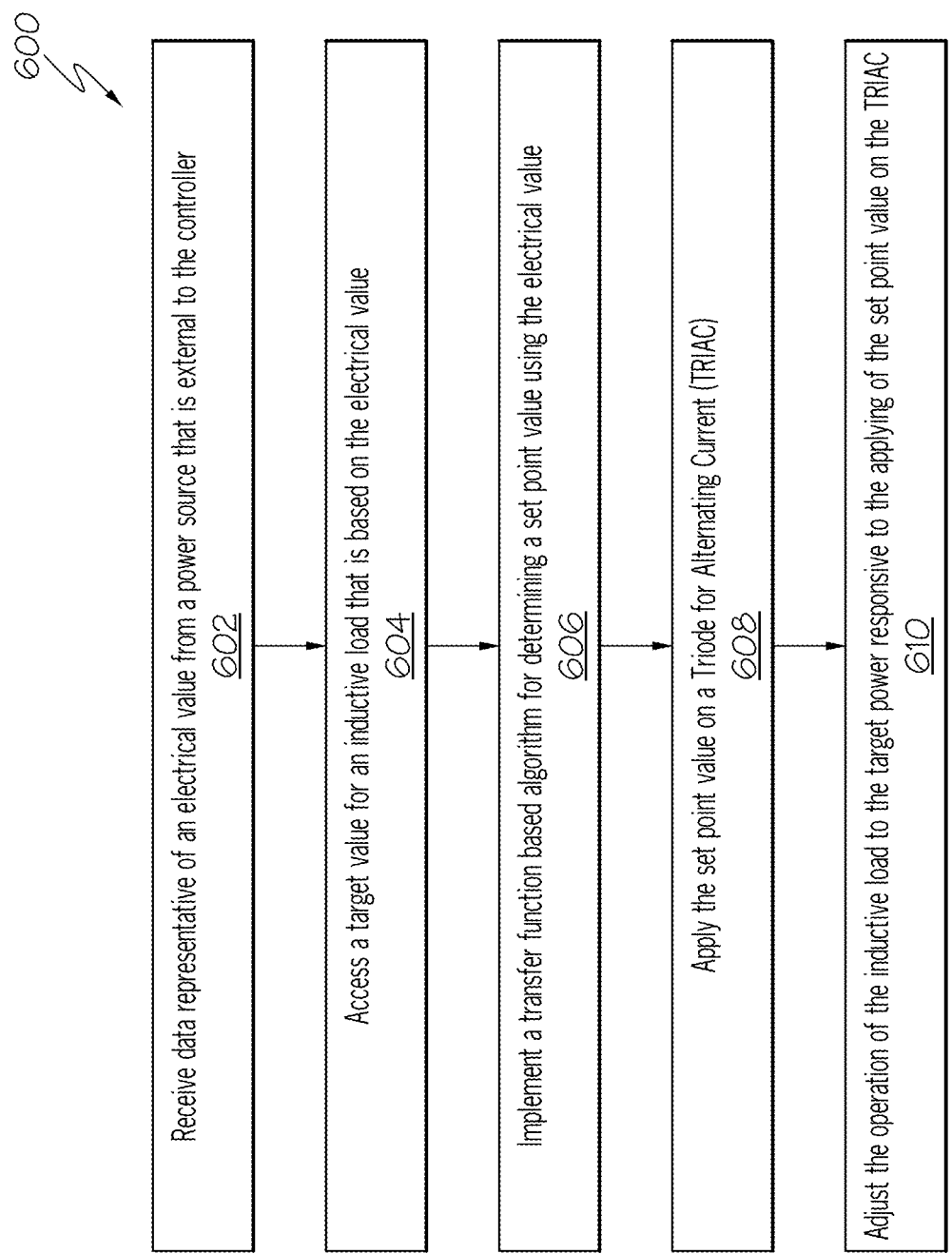
FIG. 6 illustrates a flow chart for controlling the speed of the fan when the cooking device 10 is operating in fan compensation mode, according to one or more embodiments described and illustrated herein.

FIG. 6 illustrates a flow chart 600 for controlling the speed of the fan 30 when the cooking device 10 is operating in fan compensation mode, according to one or more embodiments described and illustrated herein. It is noted that FIGS. 7-10 will be discussed interchangeably with the discussion of FIG. 6.

At block 602, the controller 100 can receive data representative of an electrical value. The electrical value can be a supply voltage, a current, or a power. In aspects, a supply voltage from a power source that is external to the controller 100 may be received. For example, as described above with respect to FIG. 5, the power sensor 76 can detect the voltage supplied to the power supply 110 by an external power source (e.g., an electrical outlet) and communicate data representative of the detected voltage to the controller 100. The controller 100 then stores the data in the memory 102 of the controller 100. While the external power source is capable of supplying 120 V, the supply voltage typically received from the external power source can be in a range from 104 V to 120 V because there is a drop in the supply voltage from 120 V to 110 V (or 104 V) when the cooking device 10 is activated (e.g., turned on). In aspects, the voltage supplied by the external power source to the power supply 110 can be in the range of 110 V to 120 V and the drop in voltage (i.e. voltage sagging) can be in a range from 2 V to 6 V. Such a voltage drop or voltage sag occurs because the external power source can be connected to a high power load such as, e.g., the inductive load 80.

At block 604, the controller 100 can access, from the memory 102, a target value (e.g., a target speed) for the inductive load 80 at the supply voltage (electrical value) that is delivered to the cooking device 10. For example, during the design and manufacture of the cooking device 10, a particular operating speed of the fan blades 82 can be preprogrammed in the memory 102. As such, the controller 100 operates to facilitate deliver of a requisite amount of electric power to the inductive load 80 to ensure that the fan blades 82 consistently operate at this preprogrammed operating speed. In fact, one of the purposes of the fan compensation mode is to ensure that the fan blades 82 consistently operate at the preprogrammed operating speed. The preprogrammed operating speed can be 1000 RPM. In other embodiments, the preprogrammed operating speed can be an operating speed range, e.g., 800 revolutions per minute (RPM), 900 RPM, 1000 RPM, or an operating speed range of 500-700 RPM.

In some embodiments, the controller 100 initiates operation of the cooking device 10 in the fan compensation mode, automatically and without user intervention, upon determining that the fan blades 82 fail to operate at the preprogrammed operating speed, e.g., 1000 RPM. One way that the controller 100 can determine the operating speed of the fan blades 82 is by receiving data from a sensor that is disposed in close proximity with or directly on the fan blades 82. In operation, the sensor can detect, substantially in real time, the rotational speed of the fan blades 82 and communicate data representative of the rotational speed to the controller 100. The controller 100 can then compare the rotational speed with the operating speed of the fan blades 82 that was preprogrammed in the memory 102 to determine whether the fan blades 82 are operating at the preprogrammed operating speed. Such sensors, however, are inaccurate, cost prohibitive, and difficult to install.

Additionally, conventional technologies suffer from excess costs because the controllers used in conventional technologies typically need an additional pin in order to communicate directly with these expensive and inaccurate sensors. The need for such separate hardware interrupts the operation of the timers on these controllers, which are configured to measure the operating speeds of motors connected to these timers. Due to these interruptions, the controllers used in conventional technologies may be unable to measure the operating speeds of various components (e.g., motors) without reducing various time critical processes of these controllers.

The methods and techniques described herein, namely the transfer function based power delivery system of the present disclosure, address and overcome the above described deficiencies. In particular, the transfer function based power delivery system utilizes one or more transfer functions in conjunction with temperature data and electric power data to control operating speed of the fan blades 82, thereby bypassing the need for the installation of sensors directly on or in close proximity of the fan blades 82. For example, the controller 100 can receive temperature data from the temperature sensor 74, electric power data from the power sensor 76, and implement one or more transfer functions using the electric power data to determine whether the fan blades 82 are rotating at a speed that matches the preprogrammed operating speed.

If the rotating speed of the fan blades 82 is less than the preprogrammed operating speed, the controller 100 can implement one or more transfer functions to enable the supply of a particular amount of electric power to the inductive load 80, which in turn will generate and supply a particular amount of mechanical power to the fan blades 82 to ensure that the fan blade rotational speed matches the preprogrammed operating speed. Similarly, if the rotating speed of the fan blades 82 is more than the preprogrammed operating speed, the controller 100 will use one or more transfer functions to supply another amount of electric power to the inductive load 80, which in turn will generate and supply another amount of mechanical power to the fan blades to ensure that the fan blade rotational speed matches the preprogrammed speed.

At block 606, the controller 100 can implement a transfer function based algorithm for determining a set point value using the electrical value of block 602. The implementation of the transfer function based algorithm can involve the processing of one or more transfer functions. In particular, the processing can involve determining, using a first transfer function, a target power for operating the inductive load 80 at the target value (e.g., target speed). The target speed corresponds the preprogrammed operating speed of the fan blades 82 described above with respect to block 604. In some embodiments, the controller 100 can access the preprogrammed operating speed stored in the memory 102 and implement a transfer function (e.g., the first transfer function) to determine an amount of electric power that has to be delivered to the inductive load 80. As stated above, the delivery of this electric power to the inductive load 80 causes the fan blades 82 to operate at the preprogrammed operating speed. It is noted that the target speed is only one example of the target value. In embodiments, the target value can correspond to aspects other than speed.

Figure 7:
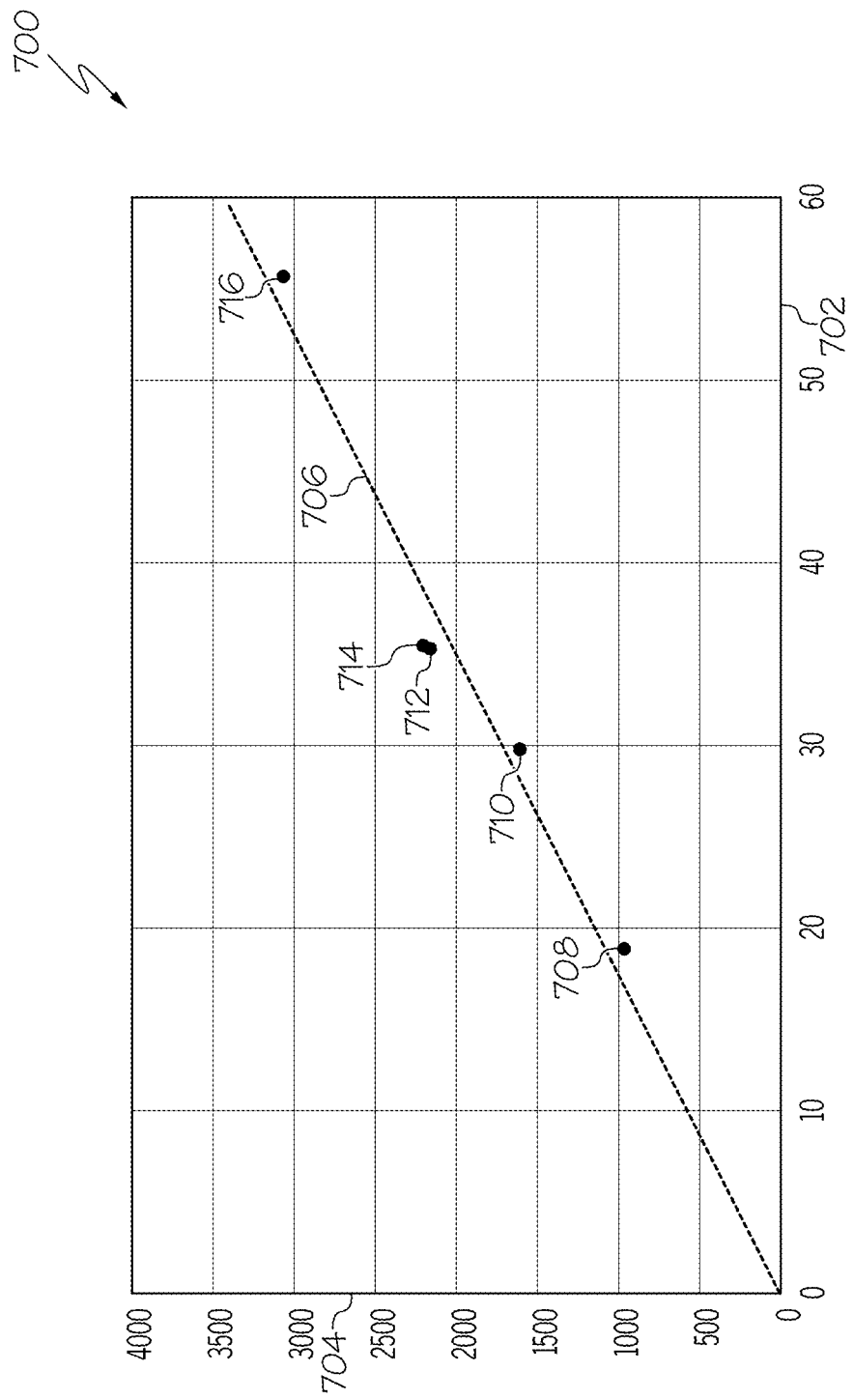
FIG. 7 illustrates a graphical representation of values that can be calculated by the controller using a first transfer function, according to some embodiments described and illustrated herein.

FIG. 7 illustrates a graphical representation 700 of values that can be calculated by the controller 100 using the first transfer function, according to some embodiments described and illustrated herein. The graphical representation 700 includes an x-axis 702 and a y-axis 704. The values on the x-axis 702 correspond to electric power delivered to the inductive load 80 at various time periods during the operation of the cooking device 10, and the values on the y-axis 704 correspond to various operating speeds of the fan blades 82 at various time periods during the operation of the cooking device 10. As illustrated, the electric power values on the x-axis 702 range from 0 to 60 W and the operating speeds on the y-axis 704 range from 0 to 4000 RPM.

The controller 100, upon accessing the target speed for the inductive load at the supply voltage received from the external power source (e.g., 104 V to 120 V), accesses and implements a first transfer function stored in the memory 102. In particular, the controller 100 inputs the target speed that is preprogrammed into the memory 102 during the design and manufacture of the cooking device 102, e.g., an operating speed of 1000 RPM, into the first transfer function, and determines a corresponding electric power value as an output of the first transfer function. The determined electric power value can then be delivered to the inductive load 80 to control operation of the fan blades 82 to ensure that the fan blades 82 operate at the target speed (i.e. preprogrammed operating speed).

For example, the controller 100 can access the target speed of 1000 RPM from the memory 102 and determine, using the first transfer function, that the corresponding electric power needed to generate this target speed is in the range of 19 Watts to 20 Watts. The controller 100 then operates to deliver the electric power of 19-20 Watts to the inductive load 80 via the TRIAC 78. The controller 100 enables the delivery of 19-20 Watts of electric power by selecting a particular setting on the TRIAC. Determining this setting requires the use of a second transfer function, as described in greater detail below.

The graphical representation 700 depicts a line 706 that accurately approximates a plurality of operating speeds of the inductive load 80 (ranging from 0 to 4000 RPM) for a plurality of electric power values (ranging from 0 to 60 Watts) given a particular supply voltage, e.g., the supply voltage in the range of approximately 104 V to 120 V. As illustrated, the relationship between a particular electric power value and a corresponding operating speed is substantially linear, as indicated by points 708, 710, 712, 714, and 716.

Further, the implementing of the transfer function based algorithm can involve the processing of a second transfer function. In particular, the processing of the second transfer function enables the determination of a set point value (e.g., a setting) specific to the target power and the supply voltage (e.g., 104 V to 110 V). After determining the target power for operating the fan blades 82 at a target speed, as described above with respect to blocks 604 and 606 above, the controller 100 can input the values of the target power at the given target speed and the supply voltage received from the external power supply into the second transfer function and determine a set point value for the TRIAC. The set point value corresponds to a setting in the TRIAC that enables the delivery of the target power to the inductive load 80, which then generates mechanical rotational energy that is delivered to the fan blades 82 to rotate at the preprogrammed operating speed.

Figure 8:
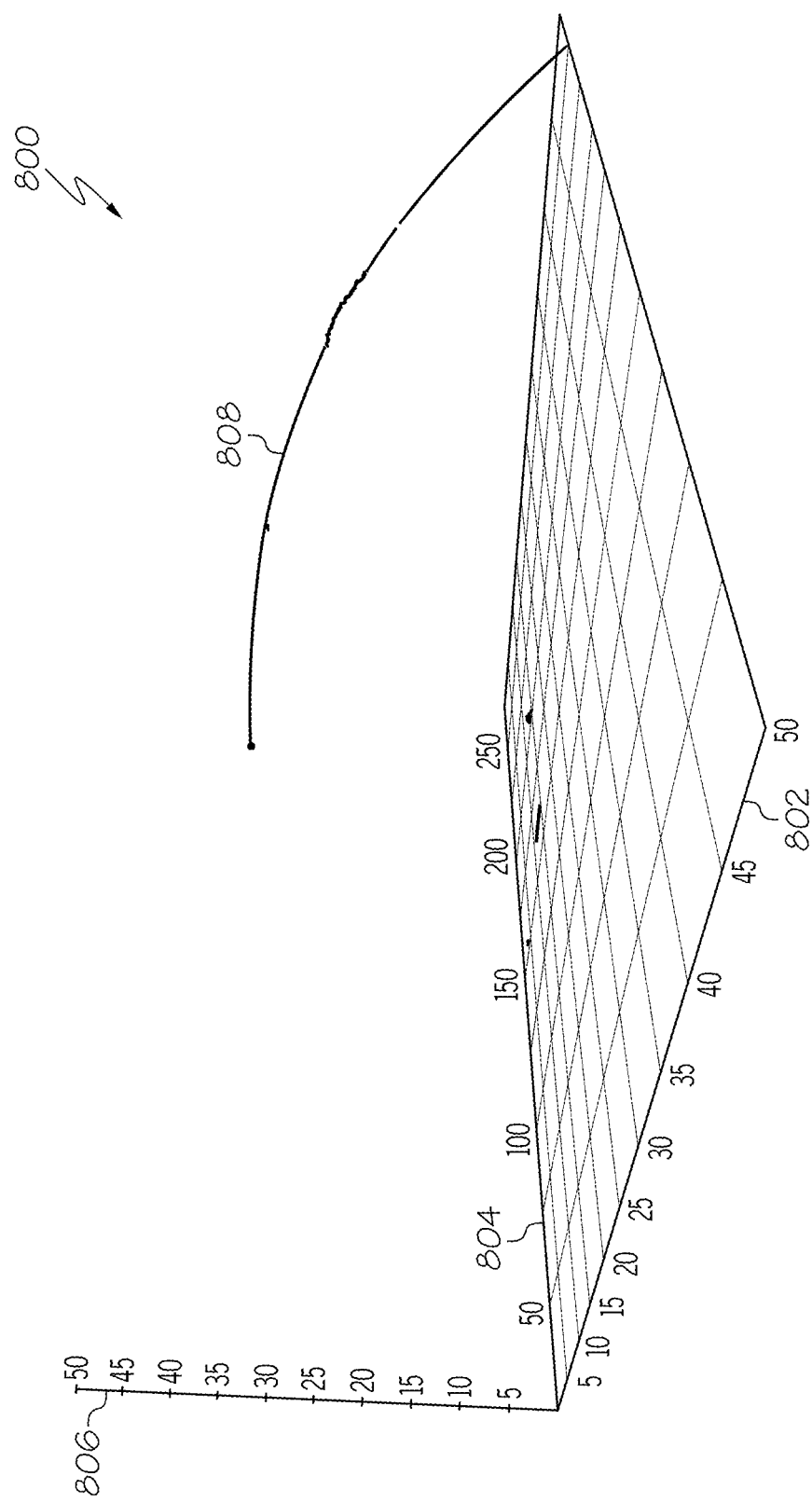
FIG. 8 illustrates a three dimensional graphical representation of values that can be calculated by the controller using a second transfer function, according to some embodiments described and illustrated herein.

FIG. 8 illustrates a three dimensional graphical representation 800 of values that can be calculated by the controller 100 using the second transfer function, according to some embodiments described and illustrated herein. In particular, the three-dimensional graphical representation 800 includes an x-axis 802 corresponding to TRIAC set point values (also referred to as Phase Angle Target (or PAT) values), a y-axis 804 corresponding to supply voltages, and a z-axis 806 that corresponds to electric power values. The graphical representation also depicts a curve 808 that captures the relationship between supply voltages, electric power values, and set point values.

As described above, the controller 100, having determined a target power value and the supply voltage, implements the second transfer function and determines a set point for the TRIAC that is specific to the target power and the supply voltage. The values that can be determined using the second transfer function are shown in the curve 808 of the three dimensional graphical representation 800. For example, for a supply voltage of 220 V and a target power of approximately 24 Watts, the TRIAC set point can have a value of approximately 28.

Figure 9:
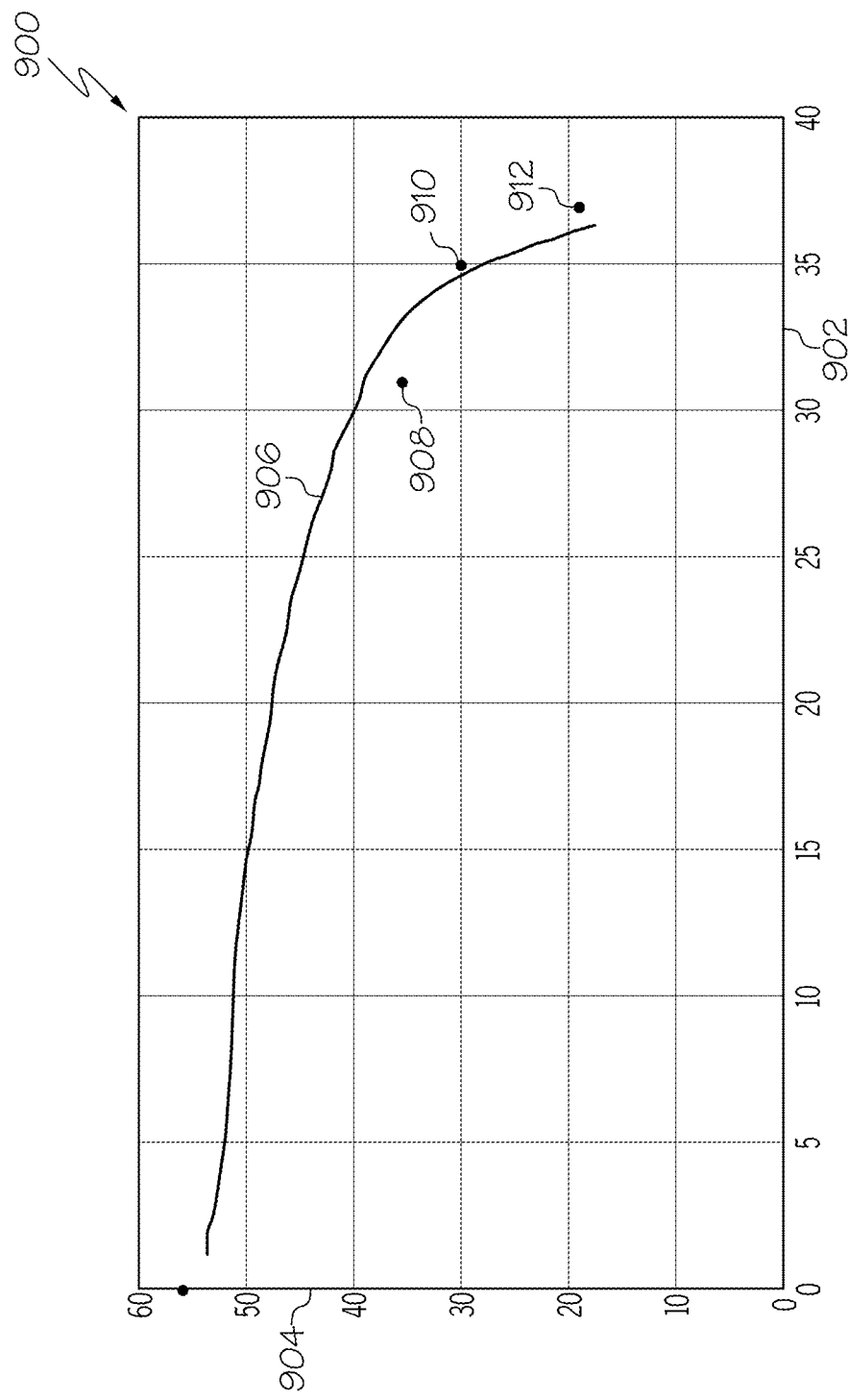
FIG. 9 depicts a two-dimensional graphical representation including only the TRIAC set point values and electric power values.

FIG. 9 depicts a two-dimensional graphical representation 900 including only the TRIAC set point values and electric power values. As illustrated, an x-axis 902 lists a plurality of set point values and a y-axis 904 lists a plurality of electric power values. The two-dimensional graphical representation 900 is a version of the three-dimensional graphical representation 800, but is based on a constant supply voltage, e.g., 110 V, 250 V, etc. As shown in the two-dimensional graphical representation 900, the curve 906 closely matches the points 908, 910, and 912, which are examples of electric power values at which the cooking device 10 can be operated. As such, the curve 808 and the curve 906, which represents various values that can be calculated using the second transfer function, show that at a particular supply voltage and an electric power value, a controller 100 can accurately determine a set point value for the TRIAC 78.

At block 608, the controller 100 applies the set point value on the TRIAC. The manner in which the set point is selected and utilized to control the operating speed of the fan blades 82 is described in greater detail below.

Figure 10:
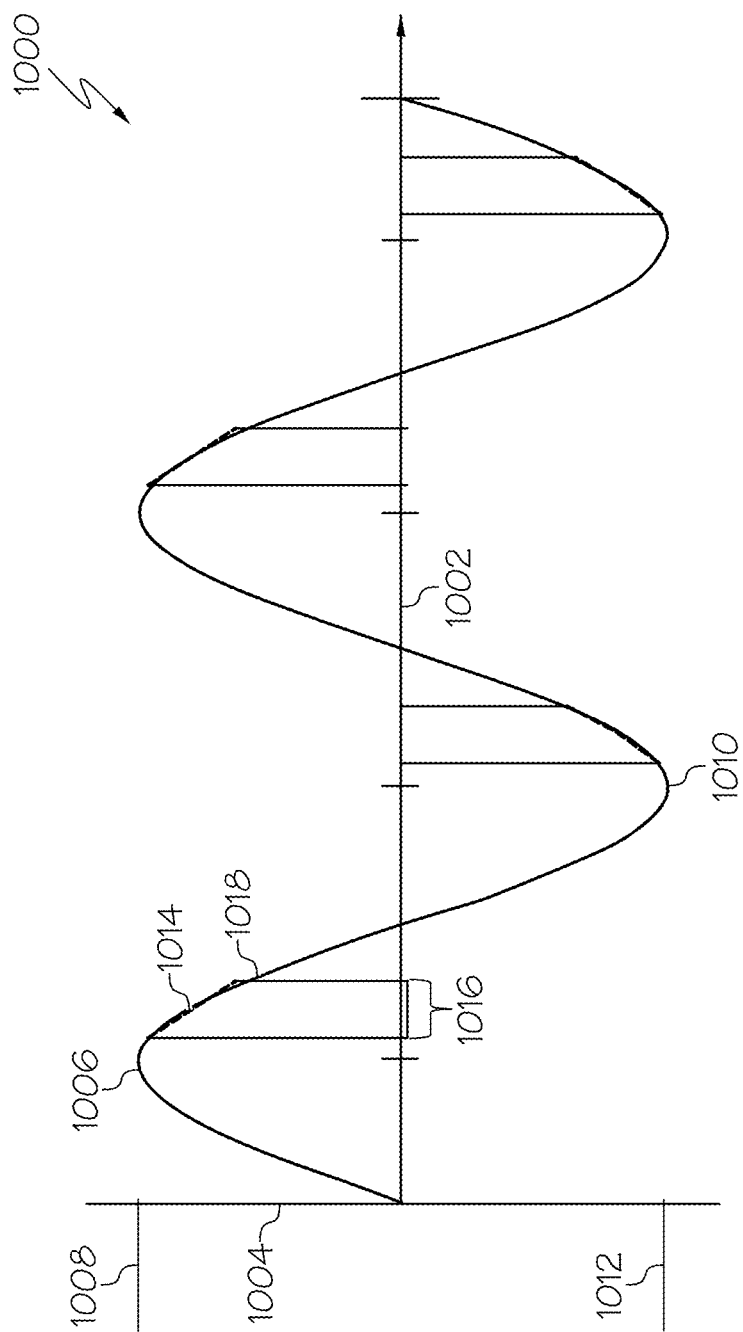
FIG. 10 depicts a set point included as part of an alternating current (AC) waveform.

FIG. 10 depicts a set point included as part of an alternating current (AC) waveform 1000. Broadly speaking, an AC waveform represents the behavior of voltage and current in an alternating current (AC) based electrical system. In this system, which is implemented on the cooking device 10, supply voltage fluctuates at various time intervals from a positive voltage to a negative voltage, which in turn results in a change in the direction of the current (flow of electrons). The fluctuation in voltage (i.e. electric potential) from the positive voltage to the negative voltage and the resulting change in the direction of the current due to this fluctuation generates the electric power that is fundamental to operating various components of the cooking device 10, namely the controller 100 and the inductive load 80.

In the AC waveform 1000 of FIG. 10, an x-axis 1002 corresponds to a plurality of time values (measured in seconds or milliseconds) and a y-axis 1004 corresponds to positive and negative voltage values. In some embodiments, as the supply voltage received by the power supply 110, as described in block 602 above, is in the range of 104 V to 110 V, the peak value 1006 of the AC waveform 1000 can be a value of, e.g., approximately 120 V. The positive voltage value 1008 at this peak value can be approximately 120 V, depending on the precise value of the supply voltage received by the power supply 110. Similarly, the trough value 1010 of the AC waveform 1000 can be a value of, e.g., (approximately −120 V). As such, the negative voltage value 1012 at this trough value can be either approximately −120 V. When the cooking device 10 is turned on or is in operation, the controller 100 receives, the supply voltage from the power supply 110, which drivers or moves a particular amount of current in a sinusoidal direction. As stated above, the driving of the current by the supply voltage in the sinusoidal orientation results in the generation of electric power that operates various components of the cooking device.

Thereafter, as stated above, the controller 100 utilizes the second transform function to determine a set point of the TRIAC 78 and applies this set point to the TRIAC 78. The controller 100 can control the amount of electric power delivered to the inductive load 80 based on the value of the set point. Each set point value represents a portion or a percentage of the wave that is filtered or blocked by the TRIAC 78. If the controller 100 applies a set point value of 0 for the TRIAC 78, the TRIAC 78 will transmit the entirety of the AC waveform 1000 that it received from the controller 100, to the inductive load 80. As a result, a maximum amount of electric power will be delivered to the inductive load 80, which in turn will result in the generation of a large amount of mechanical rotational energy that is delivered to the fan blades 82. In contrast, if a higher set point value is determined and applied to the TRIAC 78, a larger percentage of the AC waveform will be filtered or block, and as a result, a smaller amount of mechanical rotational energy will be generated and delivered to the fan blades 82.

Returning to FIG. 10, based on the selection and application of a set point (e.g., set point having a value of 30) by the controller 100, the TRIAC 78 filters or blocks a particular portion or percentage of the current shown in AC waveform 1000 from being transmitted to the inductive load 80. The portion 1014 of the AC waveform 1000 that is blocked, based on the set point, is indicated by the dotted line in FIG. 10. In operation, the TRIAC 78 blocks the portion 1014 by abruptly reducing the voltage from, e.g., the positive voltage value 1008 at the peak value 1006 of the AC waveform 1000 to a voltage of 0. The TRIAC 78 then maintains the 0 voltage value for a time frame 1016. When the voltage of 0 is maintained, the current corresponding to the portion 1014 is not transmitted to the inductive load 80, as there is no voltage available to drive the current. After a particular time frame, the TRIAC 78 increases the voltage from 0 to a voltage value 1018, which reinitiates the transfer of current to the inductive load 80. As such, the set point value of 30 represents the time frame 1016 during which the voltage is maintained at 0 V.

A large set point value, e.g., 70, results in a TRIAC 78 abruptly reducing the voltage from a particular value to 0 V and maintaining the voltage value at 0 V for a prolonged period of time, which results in a significant portion of the current of the AC waveform 1000 from being transmitted to downstream components, e.g., the inductive load 80. As such, the controller 100 can operate to significantly reduce the operating speed of the inductive load 80 by selecting and applying a set point of 70, and by extension, the operating speed of the fan blades 82. In contrast, the controller 100 can operate to increase the operating speed of the inductive load 80 by selecting and applying a set point of, e.g., 10, because such a set point results in the TRIAC 78 blocking a relatively small portion of the current of the AC waveform 1000 from being transmitted to the inductive load.

At block 610, the controller 100 adjusts operation of the inductive load to the target power responsive to the application of the set point value on the TRIAC 78. In embodiments, the operation of the inductive load 80 at the target power causes the operation of the inductive load 80 at the target speed. For example, after the controller 100 applies the set point value on the TRIAC 78 as described above with respect to block 610, the TRIAC 78 blocks a precise amount of current from the AC waveform 1000. In other words, based on the set point value applied in block 610, the TRIAC 78 enables a precise amount of current of the AC wave form 1000, and by extension, electric power, to flow to the inductive load 80, which results in the inductive load 80 generating a particular amount of mechanical rotational energy that causes the fan blades 82 to rotate at the preprogrammed operating speed of, e.g., 1000 RPM.

As explained above, the set point value that is applied to the TRIAC controls the amount of current of the AC waveform 1000 that is supplied to the inductive load 80, and by consequence, the operating speed of the fan blades 82. A large set point value (e.g., 70) that is selected and applied on the TRIAC 78 results in a reduction in the operating speed of the fan blades 82 and a smaller set point value results in an increase in the operating seed of the fan blades 82.

Having described the manner in which the controller 100 utilizes transfer functions to determine a target power for operating the inductive load to control the operating speed of the fan 30, a description of the transfer functions is instructive. Versions of the transfer function that are utilized to determine the set point of the TRIAC 78 (e.g., the second transfer function) can be expressed as follows:

$$P_{@aV}(PAT) = \frac{A}{E + e^{\left(\frac{PAT + C}{B}\right)}} + D \quad (1)$$

$$AFP(PAT, SPV) = \left(\frac{P_{@aV}(PAT) - y_o}{\alpha - x_o}\right)(SPV - x_o) + y_o \quad (2)$$

$$PAT(SPV, AFP) = \ln\left(\frac{A}{\left(\frac{(AFP - y_o) + (\alpha - x_o)}{(SPV - x_o)}\right) + y_o - D} - E\right) * B - C \quad (3)$$

As shown in expressions (1), (2), and (3), each expression includes a plurality of polynomials. It is noted that each of the above expressions represent different versions of the second transfer function that is utilized to determine a set point of the TRIAC 78. As stated above, the set point of the TRIAC 78 is also referred to as a phase angle target or the variable (PAT). The variables of A, B, C, D, E, $x_0$, $y_0$, and a are constant values that are derived from data that is gathered from monitoring the operation various components of the cooking device 100 for a particular time frame. The expression (1) and (2) are utilized by the controller 100 to determine an electric power that is delivered to the inductive load 80 based on a known phase angle target (set point) and a constant supply voltage. Additionally, expression (3) is utilized by the controller 100 to determine a phase angle target value (PAT) given an input power and a supply voltage value. The input power value (e.g., Apparent Power Value) can be defined as a target power value that is necessary to ensure that the fan blades 82 operate at an operating speed that is preprogrammed or hardwired into the memory 102 of the controller 100, as described in blocks 604 and 606 above. However, it is noted that characters or expressions other than polynomials can also be utilized in each of the first and the second transfer functions in order to implement the transfer function based electrical power delivery system described herein.

In addition, the expression (3) can be defined as a set two separate expressions:

$$PAT(\beta) = \ln\left(\frac{A}{\beta + y_o - D} - E\right) * B - C \quad (4)$$

$$\beta(AFP, SPV) = \left(\frac{(AFP - y_o) * (\alpha - x_o)}{(SPV - x_o)}\right) \quad (5)$$

Partitioning of the expression (3) into expressions (4) and (5) enables defining the function of PAT(AFT, SPV)—which is used to determine a phase angle target given the values of an electric power and a supply voltage—using a polynomial expression, which significantly reduces the space allocation requirement in the memory 102 needed to implement or process expression (3). In some embodiments, a manner in which PAT ($\beta$) is implemented and approximated is expressed by the following expression:

$$PAT(\beta) \approx PAT_{polyApprx}(\beta) = k_3 * \beta^3 + k_2 * \beta^2 + k_1 * \beta + k_0 \quad (6)$$

The above expression also includes various polynomials that, when processed by the controller 100, significantly reduce the space allocation requirement in the memory 102 needed to process expression (3). These polynomials are $k_0$, $k_1$, $k_2$, $k_3$, $\beta$, $\beta^2$, and $\beta^3$. To generate expressions (1)-(5), it is assumed that the relationship between the supply voltage and the electric power that is utilized to control the operating speed of the fan blades 82 share a linear relationship. Further, as described above, a reduction in the set point of the TRIAC 78 results in a reduction of the electric power that is delivered to the inductive load 80, and by extension, the power (i.e. mechanical rotational energy) that is delivered to the fan blades 82.

In some embodiments, the controller 100 implements a set of equations or expressions that enable compensation for and reduction of losses in electric power that may occur due to various environmental factors. In other words, these expressions, shown below, enable power factor compensation:

$$E(PAT) = \frac{(c_1 + c_2 * e^{c_3 + x})}{c_1} \quad (7)$$

$$PFP = AFP * E(PAT) \quad (8)$$

In the above expressions, the variable AFP represents the electric power that is delivered to the inductive load 80, which in turn results in the generation of the mechanical rotational energy that causes the fan blades 82 to run at a particular operating speed. The variable PFP correspond to practical fan power, which is a portion of the apparent power that corresponds to power losses that occur due to the operation of the inductive load 80. The expressions (7) and (8) are only implemented under particular conditions, which is illustrated in FIG. 11.

Figure 11:
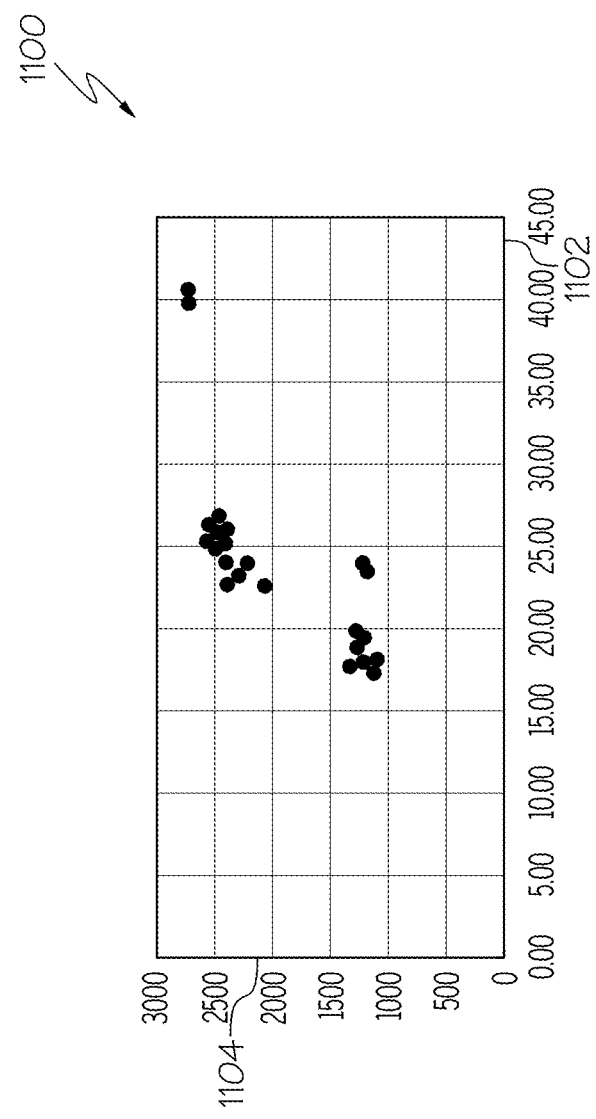
FIG. 11 depicts a non-linear relationship between operating speeds of the fan blades based on variations in the set point of the TRIAC.

FIG. 11 depicts a non-linear relationship 1100 between operating speeds of the fan blades 82 based on variations in the set point of the TRIAC 78. As illustrated in FIG. 11A, the x-axis 1102 lists a plurality of electric power values ranging from 0 to 45 Watts and the y-axis 1104 lists a plurality of operating speeds of the fan blades 82 ranging from 0 to 3000 RPM. As shown, when the electric power values are in a range from 15 to 20 Watts, the operating speeds of the fan blades 82 range from 1000 to 1500 RPM. However, when the electric power value is approximately 24 Watts, the operating speeds of the fan blades 82 vary significantly from 1000-2500 RPM. As such, the relationship between the set points and the operating speeds are not linear.

Figure 12:
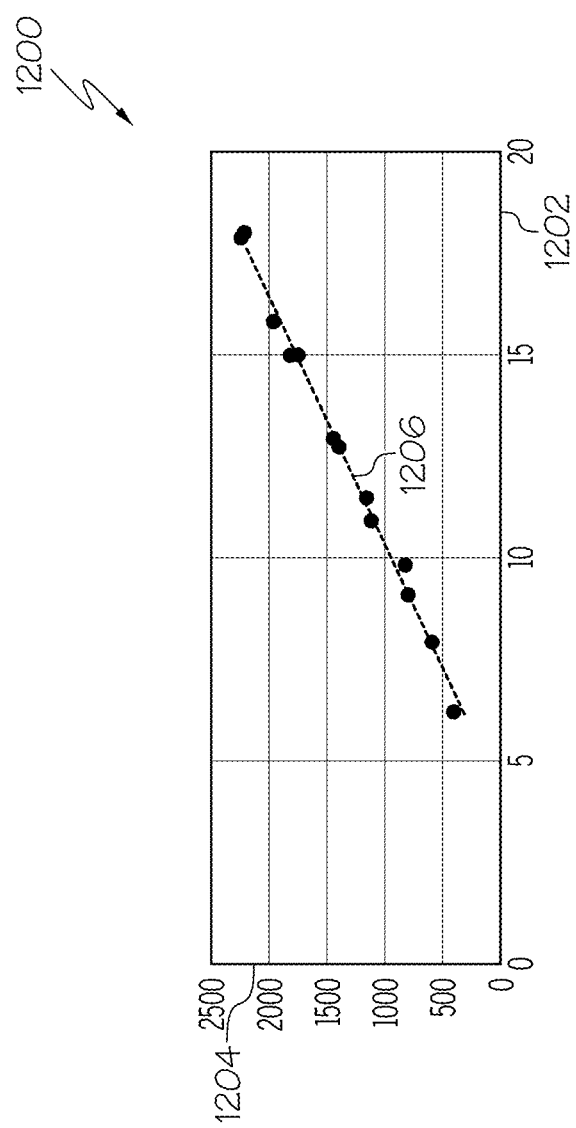
FIG. 12 depicts a substantially linear relationship between electric power values and operating speeds.

In contrast with FIG. 11, FIG. 12 depicts a substantially linear relationship 1200 between electric power values and operating speeds. FIG. 12 includes an x-axis 1202 that lists a plurality of electrical power values ranging from 0 to 20 Watts and a y-axis 1204 that lists a plurality of operating speeds ranging from 0 to 2500 RPM. As shown in FIG. 12, a number of points are positioned in close proximity to or directly on the fitting line 1206, indicating a clear linear relationship between the electric power values and the operating speeds.

In order to accurately implement the transfer functions as shown in expressions (1), (2), and (3), the parameters represented by variables of A, B, C, D, E, $x_0$, $y_0$, and $\alpha$ are obtained by the controller 100 by analyzing trends associated with the supply voltage and electric power delivered to the inductive load 80. One trend that is analyzed is the relationship between electric power delivered to the inductive load 80 (apparent power) and the supply voltage.

Figure 13A:
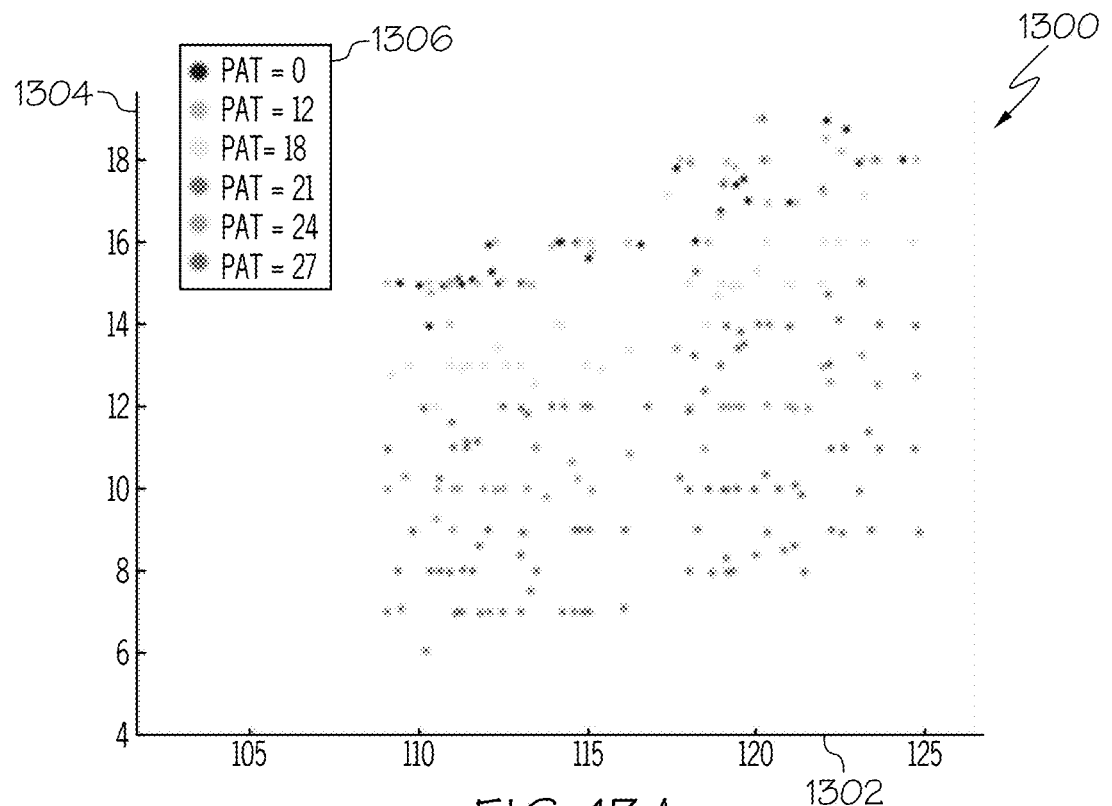
FIG. 13A depicts a graphical representation that shows a relationship between supply voltages and electric power values at various set points, according to some embodiments described and illustrated herein.
Figure 13B:
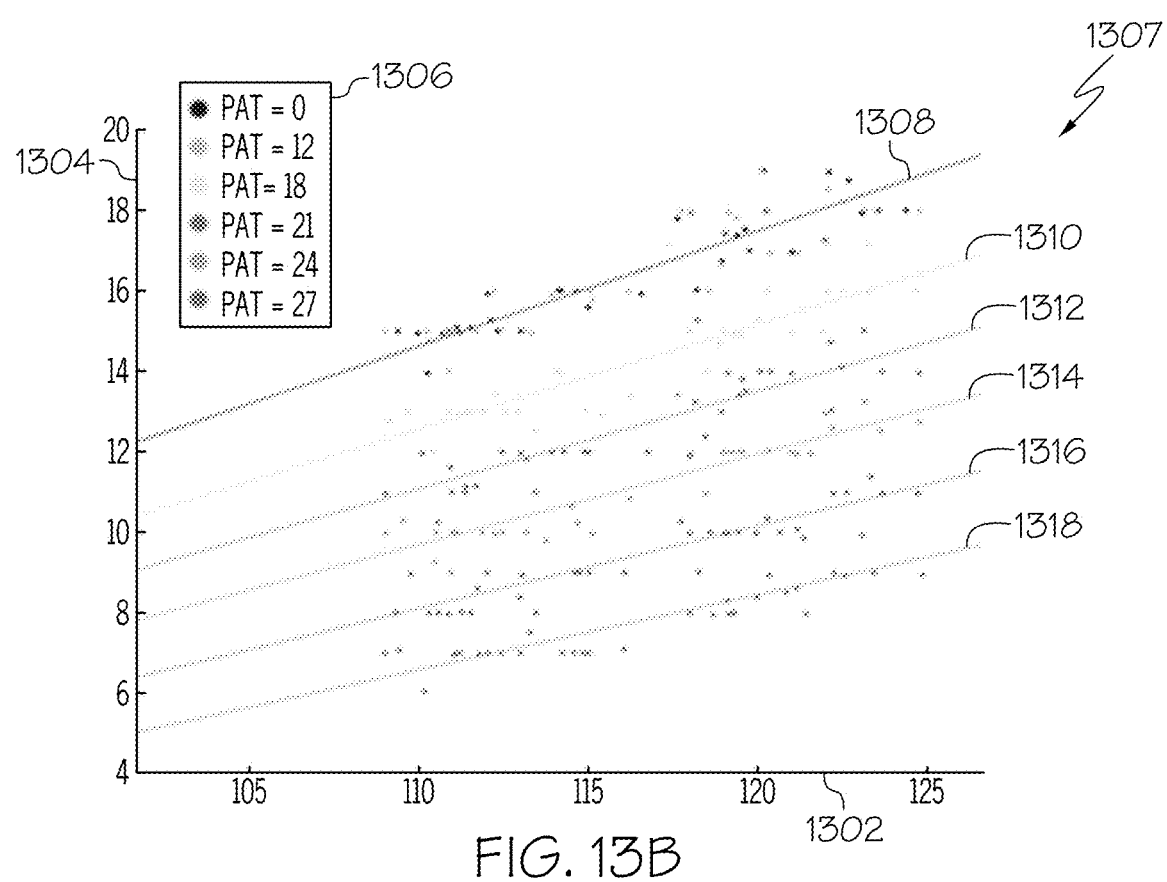
FIG. 13B depicts fitting lines that indicate relationships between electric power values and supply voltages at various set point values.

FIG. 13A depicts a graphical representation 1300 that shows a relationship between supply voltages and electric power values at various set points. The x-axis 1302 lists supply voltages ranging from 0 to 130 Volts and the y-axis 1304 lists electric power values ranging from 4 Watts to 20 Watts. Further, various subsets of points are indicated with a different color and each color corresponds to a specific phase angle target value or set point value of the TRIAC 78 (e.g., as shown in box 1306 and the graphical representation 1300). In order to determine two of the parameters—$x_0$ and $y_0$—a plurality of diagonal fitting lines may be to determine the relationship between electric power values and supply voltages at each set point, as shown in FIG. 13B. In FIG. 13B, a graphical representation 1307 depicts fitting lines 1308, 1310, 1312, 1314, 1316, and 1318 that are generated in order to determine the relationship between electric power values and supply voltages at set point values (phase angle target values) of 0, 12, 18, 21, 24, and 27. As indicated by these fitting lines, the relationship between the supply voltages and the electric power values is substantially linear. Thereafter, to determine the value of the parameters of $x_0$ and $y_0$, a point where the fitting lines 1308, 1310, 1312, 1314, 1316, and 1318 intersect is determined by the controller 100. Such an intersection point is depicted in FIG. 13C.

Figure 13C:
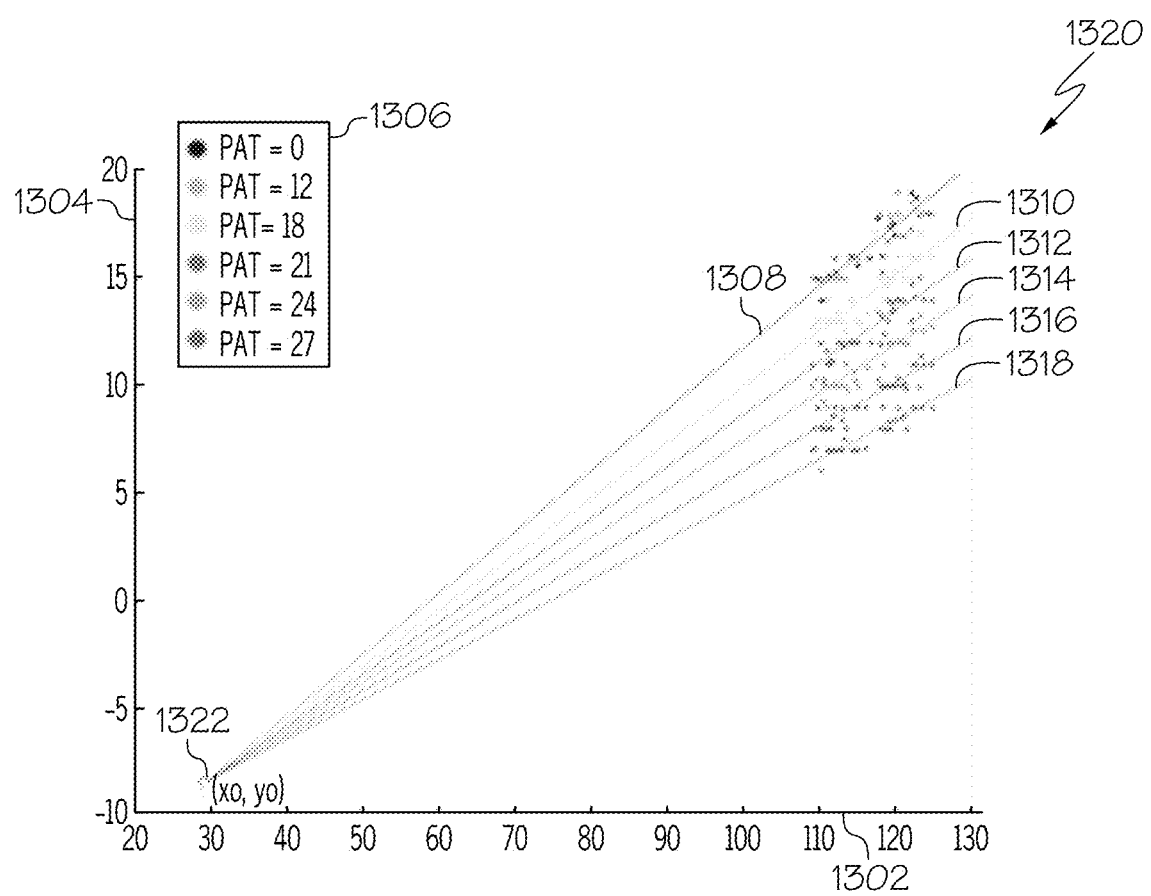
FIG. 13C illustrates a graphical representation includes an intersection point of various fitting lines and a plurality of additional supply voltage values and a plurality of additional electric power values.

FIG. 13C illustrates a graphical representation 1320 in which a plurality of additional supply voltage values are added to the x-axis 1302 and a plurality of additional electric power values are added to the y-axis 1304. The graphical representation 1320 also includes and an intersection point 1322 of various fitting lines. Specifically, the x-axis 1302 in FIG. 13C includes values ranging from 20 V to 130 V and the y-axis 1304 includes values ranging from −10 to 20 Watts. Further, the intersection point 1322 of the fitting lines 1308, 1310, 1312, 1314, 1316, and 1318 is indicated in FIG. 13C. This intersection point 1322 corresponds to the values of $x_0$ and $y_0$. In aspects, the value of $x_0$ and $y_0$ can be 28.29 and −8.46, respectively. However, it is noted the values of $x_0$ and $y_0$ can vary significantly based on differing characteristics across various systems.

Additionally, other trends can be analyzed by the controller 100 to determine the value of the parameters A, B, C, D, E, and $\alpha$.

Figure 14:
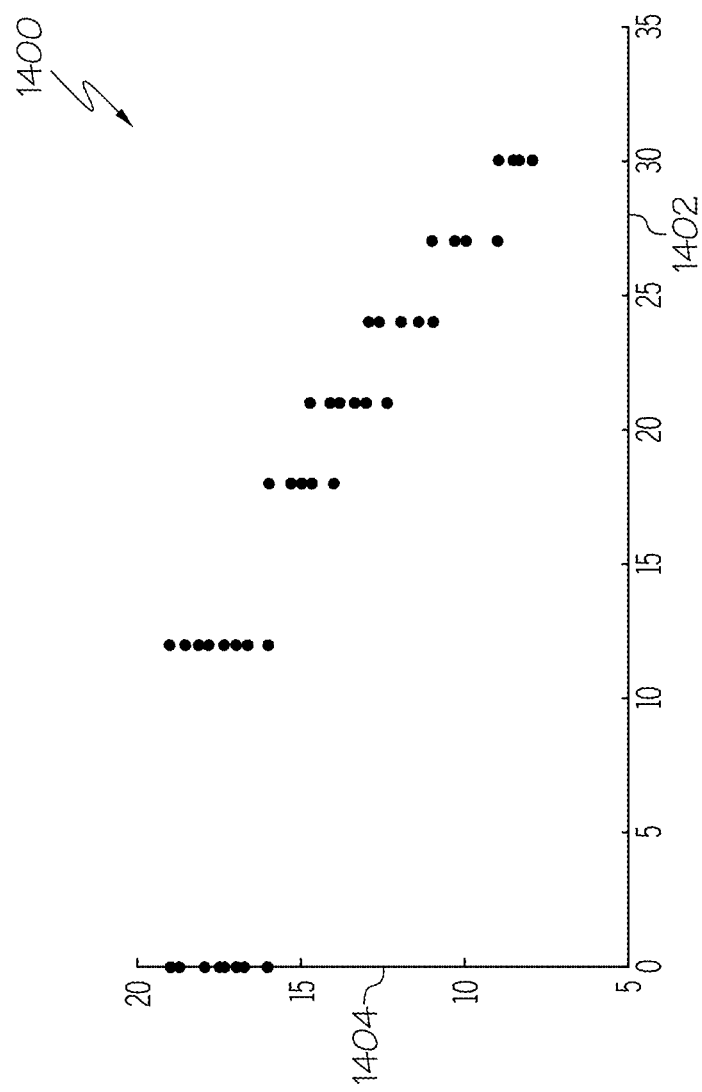
FIG. 14 depicts a graphical representation that shows a relationship between set points of the TRIAC and the electric power values at these set points.

FIG. 14 depicts a graphical representation 1400 that shows a relationship between set points of the TRIAC 78 and the electric power values at these set points. The x-axis 1402 lists a plurality of set point values ranging from 0 to 35 and the y-axis 1404 lists a plurality of electric power values, namely the electric power values delivered to the inductive load 80. These values range from 5 to 20 Watts. Further, a constant supply voltage that is delivered to controller 100 while the controller 100 applies a subset of the range of set points listed on the x-axis 1402 corresponds to the a value. In some embodiment, the a value can be approximately 112 V.

Figure 15:
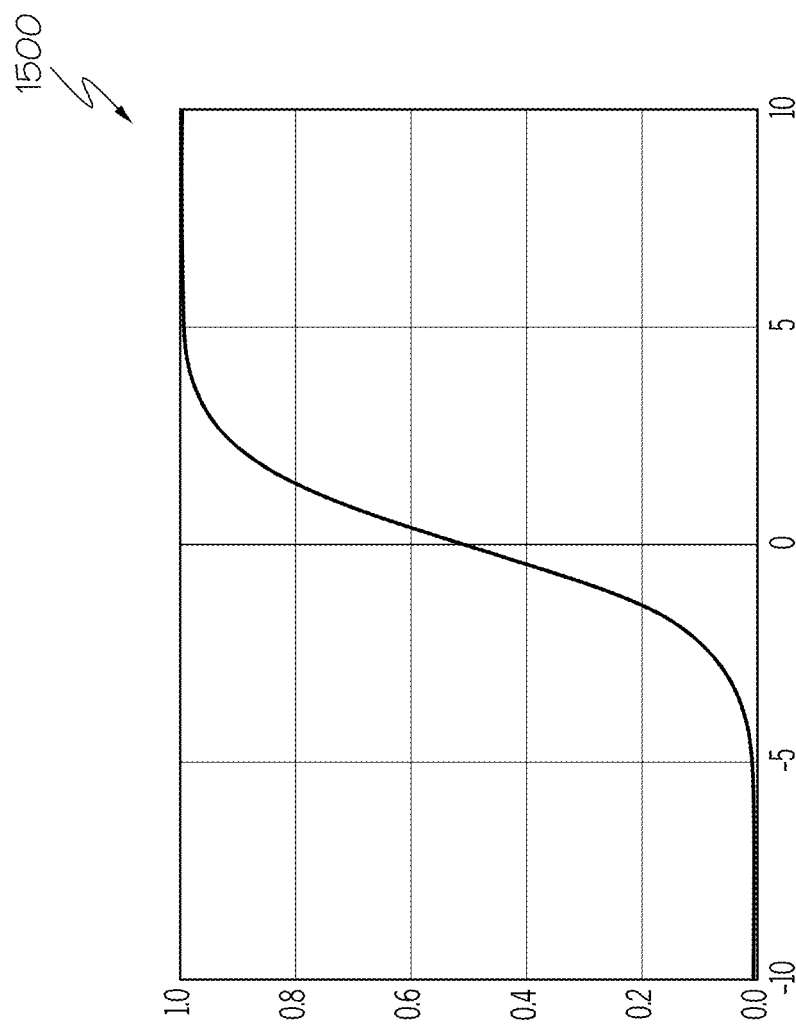
FIG. 15 depicts a graphical representation of a sigmoid function.

Thereafter, the controller 100 can apply a sigmoid function 1500 to the data depicted in the graphical representation 1400, as illustrated in FIG. 15. The sigmoid function 1500 can be represented by the following expression:

$$\sigma(z) = \frac{1}{1+e^{-x}} \quad (9)$$

Part of the application of the sigmoid function 1500 to the data includes replacing various values in expression (9) with parameters or coefficients of A, B, C, D, E such that the expression (9) can be replaced by the following expression:

$$P_{@aV}(PAT) = \frac{A}{E + e^{\left(\frac{PAT+C}{B}\right)}} + D \quad (10)$$

Thereafter, an optimization problem can be designed and solved by the controller 100 to generate a line that fits the data that is used to generate the graphical representation 1400. The optimization problem is solved by the controller 100 in order to minimize an amount of variance in the data. With respect to the optimization problem, it is noted that in order to determine the values of parameters or coefficients A, B, C, D, and E, a least squares error analysis can be performed. The implementation of the least squares error analysis enables for the determination of specific values for the parameters or coefficients A, B, C, D, and E that ensure that a specific set of data points closely fit the expression 10 (i.e. equation 10).

Figure 16:
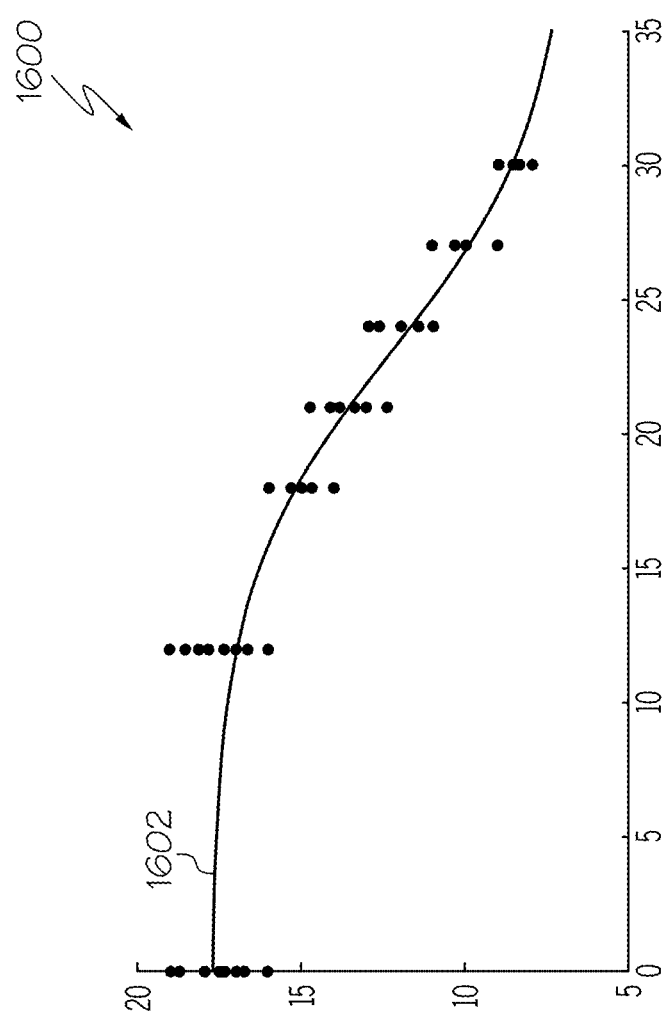
FIG. 16 depicts a graphical representation that includes a line that fits the data used to generate the graphical representation of FIG. 15, according to some embodiments described and illustrated herein.

FIG. 16 depicts a graphical representation 1600 that includes a line 1602 that fits the data used to generate the graphical representation 1400. The values of each of the coefficients A, B, C, D, E can be derived from the line 1902.

In some embodiments, the temperature sensor 74, as stated above, is configured to measure a temperature of the interior of the fuel box assembly 60 and route the temperature data to the memory 102 of the controller 100. This temperature data can be analyzed by the controller 100 to determine the overall temperature of the cooking device 10 and the components disposed therein including, e.g., the inductive load 80. In some embodiments, if the temperature data measured by the controller 100 is below a threshold value such as, e.g., ambient temperature or room temperature in the range of 59 degrees to 77 degrees (15, the controller 100 can determine that the cooking device 10 is in a cold state. As defined above, a cold state is when the cooking device 10 has not been recently used, e.g., has been off for a long period of time such as several hours.

When the cooking device 10 is initiated (e.g., turned on) from such a state, the controller 100, automatically and without user intervention, can initiate a starting condition compensation algorithm. Upon initiation of this algorithm, the controller 100 enables the application of a substantial amount electric power (e.g., high starting electric power) to the inductive load 80. The controller 100 then applies a linear decaying value to this starting electric power, over a particular time frame, to modify the electric power delivered to the inductive load 82. As a result, the electric power gradually regulates to the electric power that enables the fan blades 82 to operate at an operating speed that is preprogrammed into the memory 102, e.g., 1000 RPM. An expression that represents the linearly decaying value is as follows:

$$P_{cold\_motor}(t) = P_{hot\_motor} * \left(1 + R_{comp} \frac{(t_{comp} - t)}{t_{comp}}\right) \quad (11)$$

In the above expression, the variable $P_{cold\_motor}$ represents an amount of electric power that is delivered to the inductive load 80 upon completion of the application of the linear decaying value over a particular time frame. The variable $P_{hot\_motor}$ represents a power value that is required to generate the electric power that enables the inductive load 80 to operate at a particular target operating speed under, e.g., the condition that the inductive load 80 of the cooking device is operating at or satisfies a temperature threshold, e.g. the inductive load 80 operates at a temperature that can be classified as warm. The variable of $R_{comp}$ represents maximum multiplier ratio and $t_{comp}$ represents the time period over which the linearly decaying value is applied. It is noted that, while a linearly decaying value is described in expression 11, a non-linear decaying value such as an exponential value can also be utilized. In other words, the controller 110 can apply an exponential decaying value to a starting electric power, over a particular time frame, in order to modify the electrical power delivered to the inductive load 82.

Figure 17:
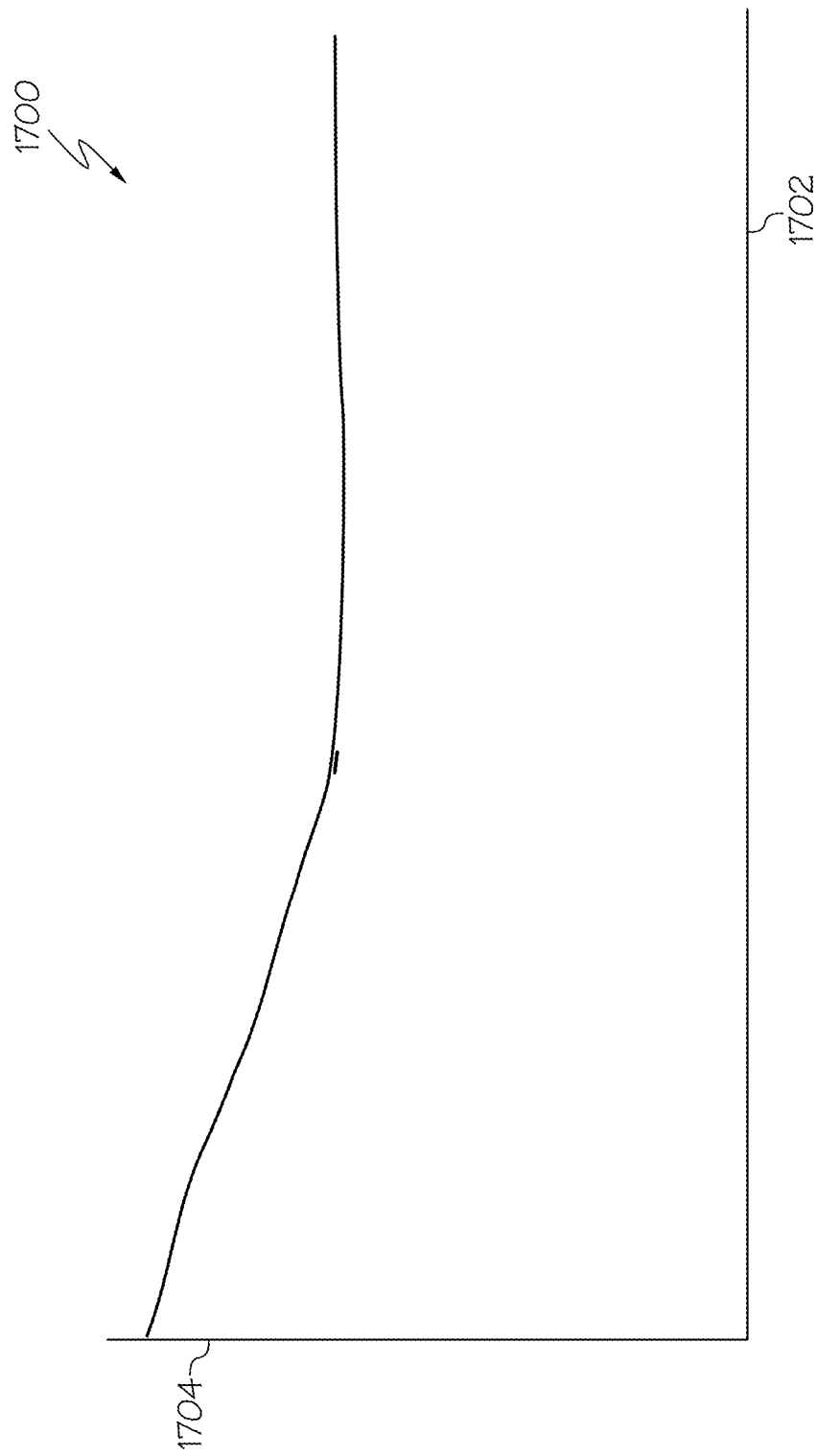
FIG. 17 depicts a graphical representation of an electric power delivered to an inductive load upon which the decaying value is applied over a particular time frame, according to some embodiments described and illustrated herein.

FIG. 17 depicts a graphical representation 1700 of an electric power delivered to an inductive load 80 upon which the linearly decaying value is applied over a particular time frame, according to some embodiments described and illustrated herein. When the cooking device 10 is turned on from a cold state, a large amount of electric power is initially delivered to the inductive load 80. When the cooking device 10 is activated from the cold state, the amount of the electric power that is delivered is gradually reduced and maintained at a particular level, as shown in FIG. 17. In FIG. 17, the x-axis 1702 corresponds to time periods and the y-axis 1704 corresponds to electric power values. In some embodiments, the cooking device 10 is determined to be in the cold state if the temperature sensor 74 detects the temperature of the cooking device 10 to be in a threshold temperature range of 15° C. to 50° C. In some embodiments, a single threshold temperature value (e.g., 21° C.) can be utilized by the controller 100.

Figure 18:
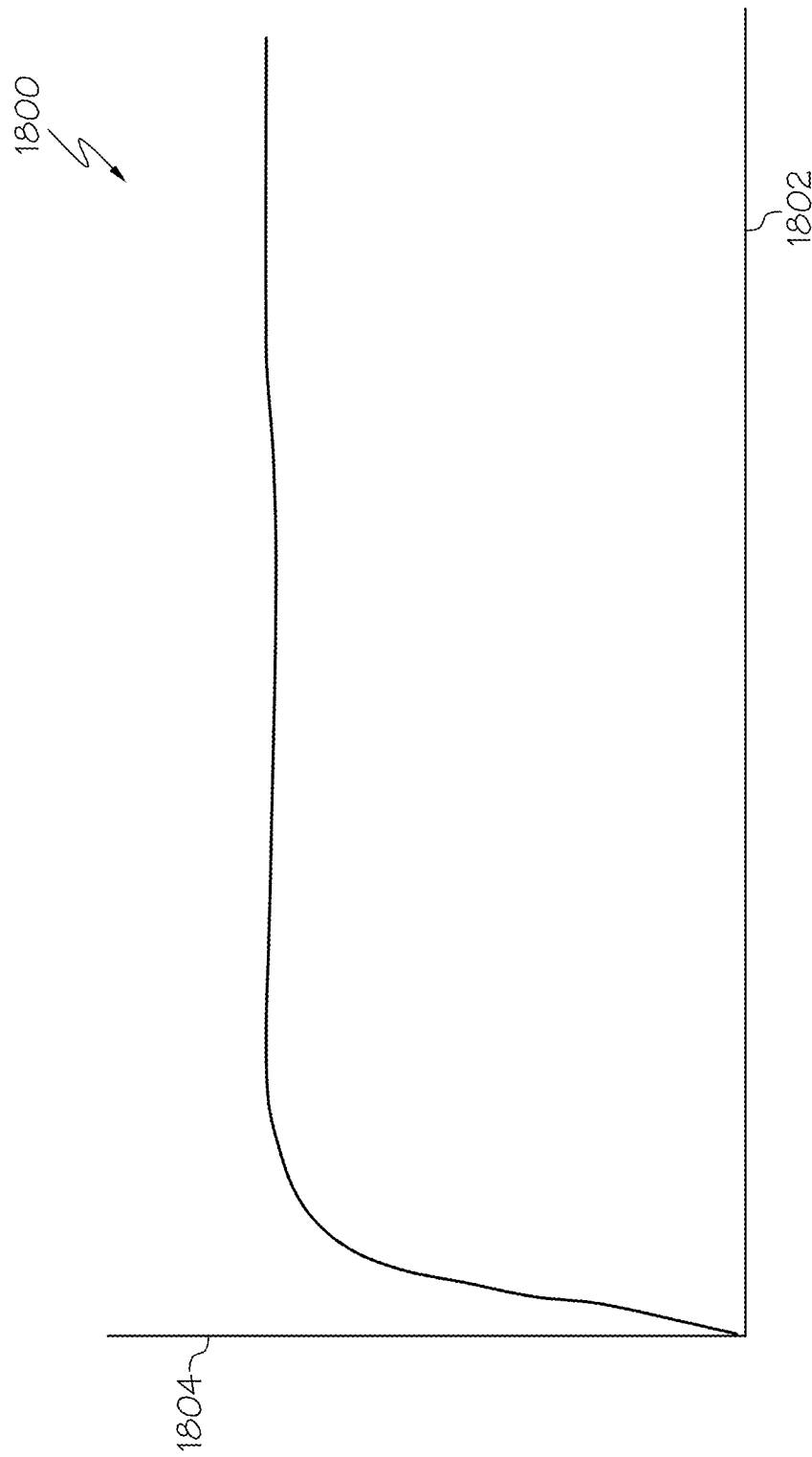
FIG. 18 depicts a graphical representation of the operating speed of the inductive load based on the gradual reduction of the electric power delivered to the inductive load, as illustrated in FIG. 17.

FIG. 18 depicts a graphical representation 1800 of the operating speed of the inductive load 80 based on the gradual reduction of the electric power delivered to the inductive, as illustrated in FIG. 17 and described above. It is noted that FIG. 18 should be interpreted in combination with FIG. 17. As shown in FIG. 18, when the cooking device 10 is turn on from a cold state and a large amount of electric power is initially delivered to the inductive load 80, there is a sudden and exponential increase in the operating speed of the inductive load, causing a similar increase in the operating speed of the fan blades 82. Thereafter, as shown in FIG. 18, the operating speed of the inductive load plateaus and is maintained at a particular level based on a steady amount of electric power being delivered to the inductive load 80 as illustrated in FIG. 17. In FIG. 18, the x-axis 1802 corresponds to time periods and the y-axis 1804 corresponds to operating speeds of the inductive load 80.

As explained above, in some embodiments, the controller 100 can monitor the length of time during which the igniter 66 is activated. As such, the controller 100 can be configured to determine whether a total length of time during which the igniter is activated exceeds the determined maximum time of activation. In response to determining that the total length of time exceeds the determined maximum time of activation, the controller 100 can cause the igniter 66 to deactivate and the cooking device 10 to exit the ignition mode.

Additionally, in some embodiments, the controller 100 can cause the igniter 66 to deactivate and the cooking device 10 to exit the ignition mode in response to various events during the operation of the cooking device 10. For example, the controller 100 can deactivate igniter 66 can deactivated and cause the cooking device 10 to exit the ignition mode in response to a user of the cooking device 10 pressing a start/stop button on the user interface 40 and/or in response to a user of the device changing the operating mode of the cooking device 10, via interaction with the user interface 40, from a smoker operating mode to an infusion operating mode.

Figure 19:
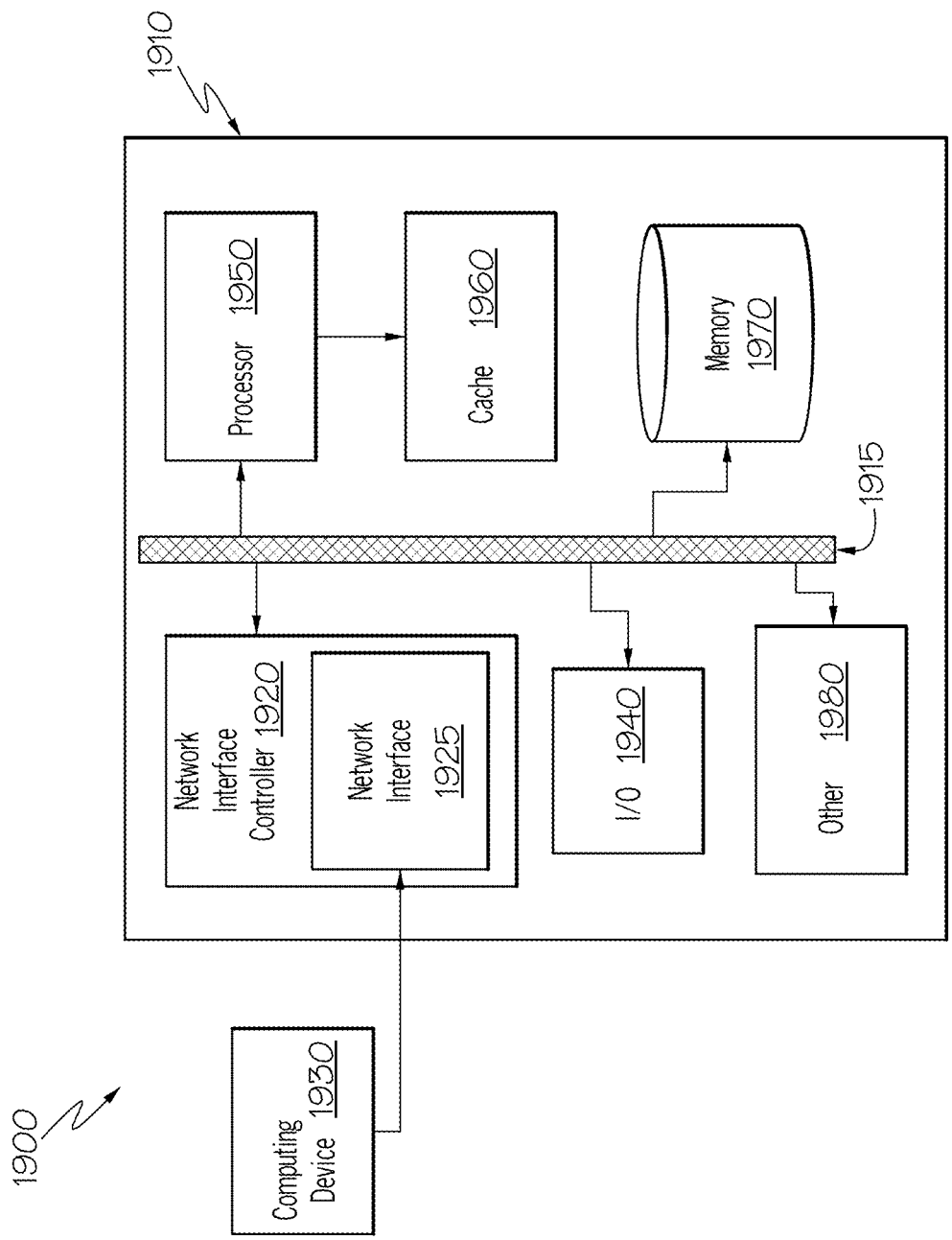
FIG. 19 is a block diagram of an exemplary computing system in accordance with an illustrative implementation of the current subject matter.

FIG. 19 is a block diagram 1900 of a computing system 1910 suitable for use in implementing the computerized components described herein. In broad overview, the computing system 1910 includes at least one processor 1950 for performing actions in accordance with instructions, and one or more memory devices (e.g., cache 1960 and/or memory 1970) for storing instructions and data. The illustrated example computing system 1910 includes one or more processors 1950 in communication, via a bus 1915, with memory 1970 and with at least one network interface controller 1920 with a network interface 1925 for connecting to external devices 1930, e.g., a computing device. The one or more processors 1950 are also in communication, via the bus 1915, with each other and with any I/O devices at one or more I/O interfaces 1940, and any other devices 1980. The processor 1950 illustrated incorporates, or is directly connected to, cache 1960. Generally, a processor will execute instructions received from memory. In some embodiments, the computing system 1910 can be configured within a cloud computing environment, a virtual or containerized computing environment, and/or a web-based microservices environment.

In more detail, the processor 1950 can be any logic circuitry that processes instructions, e.g., instructions fetched from the memory 1970 or cache 1960. In many embodiments, the processor 1950 is an embedded processor, a microprocessor unit or special purpose processor. The computing system 1910 can be based on any processor, e.g., suitable digital signal processor (DSP), or set of processors, capable of operating as described herein. In some embodiments, the processor 1950 can be a single core or multi-core processor. In some embodiments, the processor 1950 can be composed of multiple processors.

The memory 1970 can be any device suitable for storing computer readable data. The memory 1970 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing system 1910 can have any number of memory 1970.

The cache 1960 is generally a form of high-speed computer memory placed in close proximity to the processor 1950 for fast read/write times. In some implementations, the cache 1960 is part of, or on the same chip as, the processor 1950.

The network interface controller 1920 manages data exchanges via the network interface 1925. The network interface controller 1920 handles the physical, media access control, and data link layers of the Open Systems Interconnect (OSI) model for network communication. In some implementations, some of the network interface controller's tasks are handled by the processor 1950. In some implementations, the network interface controller 1920 is part of the processor 1950. In some implementations, the computing system 1910 has multiple network interface controllers 1920. In some implementations, the network interface 1925 is a connection point for a physical network link, e.g., an RJ 45 connector. In some implementations, the network interface controller 1920 supports wireless network connections and an interface port 1925 is a wireless Bluetooth transceiver. Generally, a computing system 1910 exchanges data with other external devices (the external devices 1930) via physical or wireless links to a network interface 1925. In some implementations, the network interface controller 1920 implements a network protocol such as LTE, TCP/IP Ethernet, IEEE 802.11, IEEE 802.16, Bluetooth, or the like.

The other computing device 1930 is connected to the computing system 1910 via a network interface port 1925. The other computing device 1930 can be a peer computing device, a network device, a server, or any other computing device with network functionality. In some embodiments, the computing device 1930 can be a network device such as a hub, a bridge, a switch, or a router, connecting the computing system 1910 to a data network such as the Internet.

In some uses, the I/O interface 1940 supports an input device and/or an output device (not shown). In some uses, the input device and the output device are integrated into the same hardware, e.g., as in a touch screen. In some uses, such as in a server context, there is no I/O interface 1940 or the I/O interface 1940 is not used. In some uses, other devices 1980 are in communication with the computing system 1910, e.g., external devices connected via a universal serial bus (USB).

The other devices 1980 can include an I/O interface 1940, external serial device ports, and any additional co-processors. For example, a computing system 1910 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations, an I/O device is incorporated into the computing system 1910, e.g., a touch screen on a tablet device. In some implementations, a computing system 1910 includes an additional device 880 such as a co-processor, e.g., a math co-processor that can assist the processor 1950 with high precision or complex calculations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Certain exemplary implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting exemplary implementations and that the scope of the present invention is defined solely by the claims. The features illustrated or described in connection with one exemplary implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A device comprising:
an electronic controller including memory, a power supply, a power sensor, a triode for alternative current (TRIAC), and an inductive load;
the TRIAC is in operable communication with the electronic controller and the inductive load;
the power sensor is in operable communication with the electronic controller and the power supply and is configured to:
detect data representative of an electrical value, and
route the data representative of the electrical value to the electronic controller;
the electronic controller configured to:
access, from the memory, a target value for the inductive load based on the electrical value;
implement a transfer function based algorithm for determining a set point value using the electric value;
apply the set point value on the TRIAC; and
adjust operation of the inductive load to the target power responsive to the application of the set point value on the TRIAC, the operation of the inductive load at the target power causes the operation of the inductive load at the target value.

2. The device of claim 1, further comprising a fan including at least one fan blade that is operably coupled to the inductive load, wherein the inductive load is a shaded-pole motor that controls rotational speed of the at least one fan blade disposed in the fan.

3. The device of claim 1, wherein the implementing of the transfer function based algorithm is based on at least one transfer function, the at least one transfer function is based on a linear relationship between a plurality of power values of the inductive load at the electrical value and a plurality of speeds of the inductive load the electrical value, wherein the target value is a target speed.

4. The device of claim 3, wherein:
the at least one transfer function enables mapping the plurality of speeds of the inductive load relative to a supply voltage with the plurality of power values at the supply voltage; and
the target speed is included in the plurality of speeds and the target power is included in the plurality of power values.

5. The device of claim 1, wherein the adjusting of the operation of the inductive load comprises increasing an amount of power delivered to the inductive load from a current power to the target power.

6. The device of claim 1, wherein the adjusting of the operation of the inductive load comprises decreasing an amount of power delivered to the inductive load from a current power to the target power.

7. The device of claim 1, wherein the electrical value is a supply voltage, a current, or a power.

8. The device of claim 1, further comprising a temperature sensor.

9. The device of claim 8, wherein the electronic controller is further configured to:
determine, using the temperature sensor, a current temperature of the inductive load;
compare the current temperature to a threshold temperature range, wherein the threshold temperature range is from 15° C. to 50° C.; and
initiate a starting condition compensation algorithm responsive to the current temperature being within the threshold temperature range or below the temperature threshold range.

10. The device of claim 9, wherein the initiation of the starting condition compensation algorithm by the electronic controller comprises:
applying a decaying value to a starting power; and
driving the inductive load with the starting power, upon which the decaying value is applied, for a predetermined time frame.

11. A method implemented by a controller, the method comprising:
receiving data representative of an electrical value;
accessing, from memory of the controller, a target value for an inductive load based on the electrical value;
implementing a transfer function based algorithm for determining a set point value using the electric value;
applying the set point value on a triode for alternative current (TRIAC); and
adjusting operation of the inductive load to the target power responsive to the applying of the set point value on the TRIAC, the operation of the inductive load at the target power causes operation of the inductive load at the target value.

12. The method of claim 11, wherein the inductive load is a shaded-pole motor that is coupled to a fan blade.

13. The method of claim 11, wherein the implementing of the transfer function based algorithm is based on at least one transfer function, the at least one transfer function is based on a linear relationship between a plurality of power values of the inductive load at the electrical value and a plurality of speeds of the inductive load at the electrical value, wherein the target value is a target speed.

14. The method of claim 11, wherein the adjusting of the operation of the inductive load comprises increasing an amount of power delivered to the inductive load from a current power to the target power.

15. The method of claim 11, wherein the adjusting of the operation of the inductive load comprises decreasing an amount of power delivered to the inductive load from a current power to the target power.

16. The method of claim 11, wherein the electrical value is a supply voltage, a current, or a power.

17. A system comprising:
- a power source;
- a device including a power supply, a triode for alternative current (TRIAC), an inductive load, and at least one data processor that is communicatively coupled to the TRIAC; and
- the at least one data processor storing instructions, which when executed by the at least one data processor, causes the at least one data processor to perform operations comprising:
  - determining an electrical value;
  - accessing a target value for the inductive load that is specific to the electrical value;
  - implementing a transfer function based algorithm for determining a set point value using the electric value;
  - applying the set point value on the TRIAC; and
  - adjusting operation of the inductive load to the target power responsive to the applying of the set point value on the TRIAC, the operation of the inductive load at the target power causes operation of the inductive load at the target value.

18. The system of claim 17, further comprising a temperature sensor and wherein the target value is a target speed and the electrical value is at least one of a supply voltage, a current, or a power.

19. The system of claim 18, wherein the operations further comprise:
- determining, using the temperature sensor, a current temperature of the inductive load;
- comparing the current temperature to a threshold temperature range, wherein the threshold temperature range is from 15° C. to 50° C.; and
- initiating a starting condition compensation algorithm responsive to the current temperature being within the threshold temperature range or below the temperature threshold range.

20. The system of claim 19, wherein one of the operations of the initiation of the starting condition compensation algorithm by the at least one data processor comprises;
- applying a decaying value to a starting power; and
- driving the inductive load with the starting power upon which the decaying value is applied for a predetermined time frame.

* * * * *